United States Patent
Golovin et al.

(10) Patent No.: US 12,026,612 B2
(45) Date of Patent: *Jul. 2, 2024

(54) OPTIMIZATION OF PARAMETER VALUES FOR MACHINE-LEARNED MODELS

(71) Applicant: Google LLC, Mountain View, CA (US)

(72) Inventors: Daniel Reuben Golovin, Pittsburgh, PA (US); Benjamin Solnik, Pittsburgh, PA (US); Subhodeep Moitra, Pittsburgh, PA (US); David W. Sculley, II, Cambridge, MA (US); Gregory Peter Kochanski, Pittsburgh, PA (US)

(73) Assignee: GOOGLE LLC, Mountain View, CA (US)

( * ) Notice: Subject to any disclaimer, the term of this patent is extended or adjusted under 35 U.S.C. 154(b) by 1076 days.

This patent is subject to a terminal disclaimer.

(21) Appl. No.: 16/615,303

(22) PCT Filed: Jun. 2, 2017

(86) PCT No.: PCT/US2017/035637
§ 371 (c)(1),
(2) Date: Nov. 20, 2019

(87) PCT Pub. No.: WO2018/222204
PCT Pub. Date: Dec. 6, 2018

(65) Prior Publication Data
US 2020/0167691 A1 May 28, 2020

(51) Int. Cl.
*G06N 20/00* (2019.01)
*G06N 3/08* (2023.01)
*G06N 7/01* (2023.01)

(52) U.S. Cl.
CPC .............. *G06N 3/08* (2013.01); *G06N 7/01* (2023.01); *G06N 20/00* (2019.01)

(58) Field of Classification Search
CPC . G06F 11/3409; G06F 11/3006; G06N 20/00; G06N 5/003; G06N 7/005
See application file for complete search history.

(56) References Cited

U.S. PATENT DOCUMENTS 10,257,275 B1 * 4/2019 Dirac ..................... G06N 7/005
10,877,654 B1 * 12/2020 Speare ................ G06F 3/04847

OTHER PUBLICATIONS

Bermudez-Chacon et al. (Automatic problem-specific hyperparameter optimization and model selection for supervised machine learning; 2015) (Year: 2015).*

(Continued)

*Primary Examiner* — Irete F Ehichioya
*Assistant Examiner* — Ken Hoang
(74) *Attorney, Agent, or Firm* — DORITY & MANNING, P.A.

(57) ABSTRACT

A computer-implemented method can include receiving, by one or more computing devices, one or more prior evaluations of performance of a machine learning model, the one or more prior evaluations being respectively associated with one or more prior variants of the machine-learning model, the one or more prior variants of the machine-learning model each having been configured using a different set of adjustable parameter values. The method can include utilizing, by the one or more computing devices, an optimization algorithm to generate a suggested variant of the machine-learning model based at least in part on the one or more prior evaluations of performance and the associated set of adjustable parameter values, the suggested variant of the machine-learning model being defined by a suggested set of adjustable parameter values.

20 Claims, 11 Drawing Sheets

(56) References Cited

OTHER PUBLICATIONS

Desautels et al., "Parallelizing Exploration-Exploitation Tradeoffs in Gaussian Process Bandit Optimization", Journal of Machine Learning Research, Dec. 1, 2014, 51 pages.
International Preliminary Report on Patentability for Application No. PCT/US2017/035637 dated Dec. 12, 2019, 14 pages.
Andrews et al, "Productionizing Machine Learning Pipelines at Scale", Conference on Machine Learning, 2005, Lille, France, 6 pages.
Snoek et al, "Practical Bayesian Optimization of Machine Learning Algori thms", arXiv:1206v2. Aug. 29, 2012, 12 pages.
Thakur et al, "AutoCompete: A Framework for Machine Learning Competitions", arXv:1507v1, July 8. 2015, 9 pages.
Zhang et al, "Boosting with Early Stopping: Convergence and Consistency", arXiv:math/0568276v1, Aug. 16, 2005, 44 pages.

* cited by examiner

OPTIMIZATION OF PARAMETER VALUES FOR MACHINE-LEARNED MODELS

PRIORITY CLAIM

The present application is based upon and claims the right of priority under 35 U.S.C. § 365 to International Application No. PCT/US2017/035637, filed on Jun. 2, 2017, the disclosure of which is hereby incorporated by reference herein in its entirety for all purposes.

FIELD

The present disclosure relates generally to black-box optimization. More particularly, the present disclosure relates to systems that perform black-box optimization (e.g., as a service) and to a novel black-box optimization technique.

BACKGROUND

A system can include a number of adjustable parameters that affect the quality, performance, and/or outcome of the system. Identifying parameter values that optimize the performance of the system (e.g., in general or for a particular application or user group) can be challenging, particularly when the system is complex (e.g., challenging to model) or includes a significant number of adjustable parameters.

In particular, any sufficiently complex system acts as a black-box when it becomes easier to experiment with than to understand. Hence, black-box optimization has become increasingly important as systems have become more complex.

Black-box optimization can include the task of optimizing an objective function $f: X \to \mathbb{R}$ with a limited budget for evaluations. The adjective "black-box" means that while $f(x)$ can be evaluated for any $x \in X$, any other information about $f$, such as gradients or the Hessian, is not generally known. When function evaluations are expensive, it is desirable to carefully and adaptively select values to evaluate. Thus, an overall goal of a black-box optimization technique can be to generate a sequence of $x_t$ that approaches the global optimum as rapidly as possible.

SUMMARY

Aspects and advantages of embodiments of the present disclosure will be set forth in part in the following description, or can be learned from the description, or can be learned through practice of the embodiments.

One aspect of the present disclosure is directed to a computer-implemented method for use in optimization of parameters of a system, product, or process. The method includes establishing, by one or more computing devices, an optimization procedure for a system, product, or process. The system, product, or process has an evaluable performance that is dependent on values of one or more adjustable parameters. The method includes receiving, by the one or more computing devices, one or more prior evaluations of performance of the system, product, or process. The one or more prior evaluations are respectively associated with one or more prior variants of the system, product, or process. The one or more prior variants are each defined by a set of values for the one or more adjustable parameters. The method includes utilizing, by the one or more computing devices, an optimization algorithm to generate a suggested variant based at least in part on the one or more prior evaluations of performance and the associated set of values. The suggested variant is defined by a suggested set of values for the one or more adjustable parameters. The method includes receiving, by the one or more computing devices, one or more intermediate evaluations of performance of the suggested variant. The intermediate evaluations have been obtained from on an ongoing evaluation of the suggested variant. The method includes performing, by the one or more computing devices, non-parametric regression, based on the intermediate evaluations and the prior evaluations, to determine whether to perform early-stopping of the ongoing evaluation of the suggested variant. The method includes, in response to determining that early-stopping is to be performed, causing, by the one or more computing devices, early-stopping to be performed in respect of the ongoing evaluation or providing an indication that early-stopping should be performed.

Performing, by the one or more computing devices, non-parametric regression to determine whether to perform early-stopping of the ongoing evaluation of the suggested variant can include determining, by the one or more computing devices based on the non-parametric regression, a probability of a final performance of the suggested variant exceeding a current best performance as indicated by one of the prior evaluations of performance of a prior variant. Performing, by the one or more computing devices, non-parametric regression to determine whether to perform early-stopping of the ongoing evaluation of the suggested variant can include determining, by the one or more computing devices, whether to perform early-stopping of the ongoing evaluation based on a comparison of the determined probability with a threshold.

Performing, by the one or more computing devices, non-parametric regression to determine whether to perform early-stopping of the ongoing evaluation of the suggested variant can include measuring, by the one or more computing devices, a similarity between a performance curve that is based on the intermediate evaluations and a performance curve corresponding to performance of a current best variant that is based on the prior evaluation for the current best variant.

The computer-implemented method can further include performing, by the one or more computing devices, transfer learning to obtain initial values for the one or more adjustable parameters. Performing, by the one or more computing devices, transfer learning can include identifying, by the one or more computing devices, a plurality of prior optimization procedures, the plurality of prior optimization procedures organized in a sequence. Performing, by the one or more computing devices, transfer learning can include building, by the one or more computing devices, a plurality of Gaussian Process regressors respectively for the plurality of prior optimization procedures. The Gaussian Process regressor for each prior optimization procedure is trained on one or more residuals relative to the Gaussian Process regressor for the previous prior optimization procedure in the sequence.

Another aspect of the present disclosure is directed to a computer system operable to suggest trial parameters. The computer system includes a database that stores one or more results respectively associated with one or more trials of a study. The one or more trials for the study respectively include one or more sets of values for one or more adjustable parameters associated with the study. The result for each trial includes an evaluation of the corresponding set of values for the one or more adjustable parameters. The computer system includes one or more processors and one or more non-transitory computer-readable media that store instructions that, when executed by the one or more processors, cause the computer system to perform operations. The operations include performing one or more black-box optimization techniques to generate a suggested trial based at least in part on the one or more results and the one or more sets of values respectively associated with the one or more results. The suggested trial includes a suggested set of values for the one or more adjustable parameters. The operations include accepting an adjustment to the suggested trial from a user. The adjustment includes at least one change to the suggested set of values to form an adjusted set of values. The operations include receiving a new result obtained through evaluation of the adjusted set of values. The operations include associating the new result and the adjusted set of values with the study in the database.

The operations can further include generating a second suggested trial based at least in part on the new result for the adjusted set of values, the second suggested trial including a second suggested set of values for the one or more adjustable parameters.

The operations can further include performing a plurality of rounds of generation of suggested trials using at least two different black-box optimization techniques.

The operations can further include automatically and dynamically changing black-box optimization techniques between at least two of the plurality of rounds of generation of suggested trials.

The one or more black-box optimization techniques can be stateless so as to enable switching between black-box optimization techniques during the study.

The operations can further include performing a plurality of rounds of generation of suggested trials. The operations can further include receiving a change to a feasible set of values for at least one of the one or more adjustable parameters between at least two of the plurality of rounds of generation of suggested trials.

The operations can further include receiving a plurality of requests for additional suggested trials for the study. The operations can further include batching at least a portion of the plurality of requests together. The operations can further include generating, as a batch, the additional suggested trials in response to the plurality of requests.

The operations can further include receiving intermediate statistics associated with an ongoing trial. The operations can further include performing non-parametric regression on the intermediate statistics to determine whether to perform early stopping of the ongoing trial.

The operations can further include performing transfer learning to obtain initial values for the one or more adjustable parameters. Performing transfer learning can include identifying a plurality of studies. The plurality of studies can be organized in a sequence. Performing transfer learning can include building a plurality of Gaussian Process regressors respectively for the plurality of studies. The Gaussian Process regressor for each study can be trained on one or more residuals relative to the Gaussian Process regressor for the previous study in the sequence.

The operations can further include providing for display a parallel coordinates visualization of the one or more results and the one or more sets of values for the one or more adjustable parameters.

Another aspect of the present disclosure is directed to a computer-implemented method to suggest trial parameters. The method includes establishing, by one or more computing devices, a study that includes one or more adjustable parameters. The method includes receiving, by the one or more computing devices, one or more results respectively associated with one or more trials of the study. The one or more trials respectively include one or more sets of values for the one or more adjustable parameters. The result for each trial includes an evaluation of the corresponding set of values for the one or more adjustable parameters. The method includes generating, by the one or more computing devices, a suggested trial based at least in part on the one or more results and the one or more sets of values. The suggested trial includes a suggested set of values for the one or more adjustable parameters. The method includes receiving, by the one or more computing devices, an adjustment to the suggested trial from a user. The adjustment includes at least one change to the suggested set of values to form an adjusted set of values. The method includes receiving, by the one or more computing devices, a new result associated with the adjusted set of values. The method includes associating, by the one or more computing devices, the new result and the adjusted set of values with the study.

The method can further include generating, by the one or more computing devices, a second suggested trial based at least in part on the new result for the adjusted set of values. The second suggested trial can include a second suggested set of values for the one or more adjustable parameters.

Generating, by the one or more computing devices, the suggested trial can include performing, by the one or more computing devices, a first black-box optimization technique to generate the suggested trial based at least in part on the one or more results and the one or more sets of values. Generating, by the one or more computing devices, the second suggested trial can include performing, by the one or more computing devices, a second black-box optimization technique to generate the second suggested trial based at least in part on the new result for the adjusted set of values. The second black-box optimization technique can be different from the first black-box optimization technique.

The method can further include, prior to performing, by the one or more computing devices, the second black-box optimization technique to generate the second suggested trial, receiving, by the one or more computing devices, a user input that selects the second black-box optimization technique from a plurality of available black-box optimization techniques.

The method can further include, prior to performing, by the one or more computing devices, the second black-box optimization technique to generate the second suggested trial, automatically selecting, by the one or more computing devices, the second black-box optimization technique from a plurality of available black-box optimization techniques.

Automatically selecting, by the one or more computing devices, the second black-box optimization technique from the plurality of available black-box optimization techniques can include automatically selecting, by the one or more computing devices, the second black-box optimization technique from the plurality of available black-box optimization techniques based at least in part on one or more of: a total number of trials associated with the study, a total number of adjustable parameters associated with the study, and a user-defined setting indicative of a desired processing time.

Generating, by the one or more computing devices, the suggested trial based at least in part on the one or more results and the one or more sets of values can include requesting, by the one or more computing devices via an internal abstract policy, generation of the suggested trial by an external custom policy provided by the user. Generating, by the one or more computing devices, the suggested trial based at least in part on the one or more results and the one or more sets of values can include receiving, by the one or more computing devices, the suggested trial from the external custom policy provided by the user.

Another aspect of the present disclosure is directed to a computer-implemented method for use in optimization of parameter values for machine-learning models. The method includes receiving, by one or more computing devices, one or more prior evaluations of performance of a machine learning model. The one or more prior evaluations are respectively associated with one or more prior variants of the machine-learning model. The one or more prior variants of the machine-learning model each have been configured using a different set of adjustable parameter values. The method includes utilizing, by the one or more computing devices, an optimization algorithm to generate a suggested variant of the machine-learning model based at least in part on the one or more prior evaluations of performance and the associated set of adjustable parameter values. The suggested variant of the machine-learning model is defined by a suggested set of adjustable parameter values. The method includes receiving, by the one or more computing devices, one or more intermediate evaluations of performance of the suggested variant of the machine-learning model. The intermediate evaluations have been obtained from an ongoing evaluation of the suggested variant of the machine-learning model. The method includes performing, by the one or more computing devices, non-parametric regression, based on the intermediate evaluations and the prior evaluations, to determine whether to perform early-stopping of the ongoing evaluation of the suggested variant of the machine-learning model. The method includes, in response to determining that early-stopping is to be performed, causing, by the one or more computing devices, early-stopping to be performed in respect of the ongoing evaluation of the suggested variant of the machine-learning model.

Performing, by the one or more computing devices, non-parametric regression to determine whether to perform early-stopping of the ongoing evaluation of the suggested variant of the machine-learning model can include determining, by the one or more computing devices based on the non-parametric regression, a probability of a final performance of the suggested variant of the machine-learning model exceeding a current best performance as indicated by one of the prior evaluations of performance of a prior variant of the machine-learning model. Performing, by the one or more computing devices, non-parametric regression to determine whether to perform early-stopping of the ongoing evaluation of the suggested variant of the machine-learning model can include determining, by the one or more computing devices, whether to perform early-stopping of the ongoing evaluation based on a comparison of the determined probability with a threshold.

Performing, by the one or more computing devices, non-parametric regression to determine whether to perform early-stopping of the ongoing evaluation of the suggested variant of the machine-learning model can include measuring, by the one or more computing devices, a similarity between a performance curve that is based on the intermediate evaluations and a performance curve corresponding to performance of a current best variant of the machine-learning model that is based on the prior evaluation for the current best variant of the machine-learning model.

The method can further include performing, by the one or more computing devices, transfer learning to obtain initial values for the one or more adjustable parameters of the machine-learning model. Performing, by the one or more computing devices, transfer learning can include identifying, by the one or more computing devices, a plurality of previously-optimized machine-learned models, the plurality of previously-optimized machine-learned models being organized in a sequence. Performing, by the one or more computing devices, transfer learning can include building, by the one or more computing devices, a plurality of Gaussian Process regressors respectively for the plurality of previously-optimized machine-learned models. The Gaussian Process regressor for each previously-optimized machine-learned model can be trained on one or more residuals relative to the Gaussian Process regressor for the previous previously-optimized machine-learned model in the sequence.

Another aspect of the present disclosure is directed to a computer system operable to suggest parameter values for machine-learned models. The computer system includes a database that stores one or more results respectively associated with one or more sets of parameter values for one or more adjustable parameters of a machine-learned model. The result for each set of parameter values includes an evaluation of the machine-learned model constructed with such set of parameter values for the one or more adjustable parameters. The computer system includes one or more processors and one or more non-transitory computer-readable media that store instructions that, when executed by the one or more processors, cause the computer system to perform operations. The operations include performing one or more black box optimization techniques to generate a suggested set of parameter values for the one or more adjustable parameters of the machine-learned model based at least in part on the one or more results and the one or more sets of parameter values respectively associated with the one or more results. The operations include accepting an adjustment to the suggested set of parameter values from a user. The adjustment includes at least one change to the suggested set of parameter values to form an adjusted set of parameter values. The operations include receiving a new result obtained through evaluation of the machine-learned model constructed with the adjusted set of parameter values. The operations include associating the new result and the adjusted set of parameter values with the one or more results and the one or more sets of parameter values in the database.

The operations can further include generating a second suggested set of parameter values for the one or more adjustable parameters of the machine-learned model based at least in part on the new result for the adjusted set of parameter values.

The one or more adjustable parameters of the machine-learned model can include one or more adjustable hyperparameters of the machine-learned model.

The operations can further include performing a plurality of rounds of generation of suggested sets of parameter values using at least two different black box optimization techniques.

The operations can further include automatically changing black box optimization techniques between at least two of the plurality of rounds of generation of suggested sets of parameter values.

The at least two different black box optimization techniques can be stateless so as to enable switching between black box optimization techniques between at least two of the plurality of rounds of generation of suggested sets of parameter values.

The operations can further include performing a plurality of rounds of generation of suggested sets of parameter values. The operations can further include receiving a change to a feasible set of values for at least one of the one or more adjustable parameters of the machine-learned model between at least two of the plurality of rounds of generation of suggested sets of parameter values.

The operations can further include receiving intermediate statistics associated with an ongoing evaluation of an additional set of parameter values. The operations can further include performing non-parametric regression on the intermediate statistics to determine whether to perform early stopping of the ongoing evaluation.

The operations can further include performing transfer learning to obtain initial parameter values for the one or more adjustable parameters. Performing transfer learning can include identifying a plurality of previously studied machine-learned models. The plurality of previously studied machine-learned models can be organized in a sequence. Performing transfer learning can include building a plurality of Gaussian Process regressors respectively for the plurality of previously studied machine-learned models. The Gaussian Process regressor for each previously studied machine-learned model can be trained on one or more residuals relative to the Gaussian Process regressor for the previous previously studied machine-learned model in the sequence.

The operations can further include providing for display a parallel coordinates visualization of the one or more results and the one or more sets of parameter values for the one or more adjustable parameters.

Another aspect of the present disclosure is directed to a computer-implemented method to suggest parameter values for machine-learned models. The method includes receiving, by the one or more computing devices, one or more results respectively associated with one or more sets of parameter values for one or more adjustable parameters of a machine-learned model. The result for each set of parameter values includes an evaluation of the machine-learned model constructed with such set of parameter values for the one or more adjustable parameters. The method includes generating, by the one or more computing devices, a suggested set of parameter values for the one or more adjustable parameters of the machine-learned model based at least in part on the one or more results and the one or more sets of parameter values respectively associated with the one or more results. The method includes receiving, by the one or more computing devices, an adjustment to the suggested set of parameter values from a user. The adjustment includes at least one change to the suggested set of parameter values to form an adjusted set of parameter values. The method includes receiving, by the one or more computing devices, a new result associated with the adjusted set of parameter values. The method includes associating, by the one or more computing devices, the new result and the adjusted set of parameter values with the one or more results and the one or more sets of parameter values.

The one or more adjustable parameters of the machine-learned model can include one or more adjustable hyperparameters of the machine-learned model.

The method can further include generating, by the one or more computing devices, a second suggested set of parameter values for the one or more adjustable parameters of the machine-learned model based at least in part on the new result for the adjusted set of parameter values.

Generating, by the one or more computing devices, the suggested set of parameter values can include performing, by the one or more computing devices, a first black box optimization technique to generate the suggested set of parameter values based at least in part on the one or more results and the one or more sets of parameter values. Generating, by the one or more computing devices, the second suggested set of parameter values can include performing, by the one or more computing devices, a second black box optimization technique to generate the second suggested set of parameter values based at least in part on the new result for the adjusted set of values. The second black box optimization technique can be different from the first black box optimization technique.

The method can further include, prior to performing, by the one or more computing devices, the second black box optimization technique to generate the second suggested set of parameter values, receiving, by the one or more computing devices, a user input that selects the second black box optimization technique from a plurality of available black box optimization techniques.

The method can further include, prior to performing, by the one or more computing devices, the second black box optimization technique to generate the second suggested set of parameter values, automatically selecting, by the one or more computing devices, the second black box optimization technique from a plurality of available black box optimization techniques.

Automatically selecting, by the one or more computing devices, the second black box optimization technique from the plurality of available black box optimization techniques can include automatically selecting, by the one or more computing devices, the second black box optimization technique from the plurality of available black box optimization techniques based at least in part on one or more of: a total number of results associated with the machine-learned model, a total number of adjustable parameters associated with the machine-learned model, and a user-defined setting indicative of a desired processing time.

Generating, by the one or more computing devices, the suggested set of parameter values based at least in part on the one or more results and the one or more sets of parameter values can include requesting, by the one or more computing devices via an internal abstract policy, generation of the suggested set of parameter values by an external custom policy provided by the user. Generating, by the one or more computing devices, the suggested set of parameter values based at least in part on the one or more results and the one or more sets of parameter values can include receiving, by the one or more computing devices, the suggested set of parameter values from the external custom policy provided by the user.

Another aspect of the present disclosure is directed to a computer-implemented method for black box optimization of parameters of a system, product, or process. The method includes performing, by one or more computing devices, one or more iterations of a sequence of operations. The sequence of operations includes determining, by the one or more computing devices, whether to sample an argument value from a feasible set of argument values using a first approach or using a second approach. Each argument value of the feasible set defines values for each of plural parameters of a system, product, or process. The sequence of operations includes, based on the determination, sampling, by the one or more computing devices, the argument value using the first approach or the second approach. The first approach includes sampling, by the one or more computing devices, the argument value at random from the feasible set and the second approach includes sampling, by the one or more computing devices, the argument value from a subset of the feasible set that is defined based on a ball around a current best argument value. The sequence of operations includes determining, by the one or more computing devices, whether a performance measure of the system, product, or process that has been determined using parameters defined by the sampled argument value is closer-to-optimal than a current closest-to-optimal performance measure. The sequence of operations includes, if the performance measure is closer-to-optimal than the current closest-to-optimal performance measure, updating, by the one or more computing devices, the current best argument value based on the sampled argument value. After completion of a final iteration of the sequence, the method includes outputting, by the one or more computing devices, the values of the parameters defined by the current best argument value for use in configuration of the system, formulation of the product or execution of the process.

The ball can be localized around the current best argument value and can define a boundary of the subset of the feasible set from which sampling is performed in the second approach.

The ball can be defined by a radius that is selected at random from a geometric series of radii.

An upper limit on the geometric series of radii can be dependent on a diameter of a dataset, a resolution of the dataset and a dimensionality of an objective function.

The determination whether to sample the argument value from the feasible set of argument values using the first approach or using the second approach can be probabilistic.

Sampling the argument value using the second approach can include determining, by the one or more computing devices, the argument value from the subset of the feasible set that is bounded by the ball that is localized around the current best argument value. Sampling the argument value using the second approach can include projecting, by the one or more computing devices, the determined argument value onto the feasible set of argument values, thereby to obtain the sampled argument value.

Another aspect of the present disclosure is directed to a computer system operable to perform black box optimization. The computer system includes one or more processors and one or more non-transitory computer-readable media that store instructions that, when executed by the one or more processors, cause the computer system to perform operations. The operations include identifying a best observed set of values for one or more adjustable parameters. The operations include determining a radius. The operations include generating a ball that has the radius around the best observed set of values for the one or more adjustable parameters. The operations include determining a random sample from within the ball. The operations include determining a suggested set of values for the one or more adjustable parameters based at least in part on the random sample from within the ball.

Determining the radius can include randomly sampling the radius from within a geometric series.

Determining the radius can include determining the radius based at least in part on a user-defined resolution term.

Determining the radius can include randomly sampling the radius from a distribution of available radii that has a minimum equal to a user-defined resolution term.

Determining the radius can include randomly sampling the radius from a distribution of available radii that has a maximum that is based at least in part on a diameter of a feasible set of values for the one or more adjustable parameters.

Determining the suggested set of values for the one or more adjustable parameters based at least in part on the random sample from within the ball can include selecting, as the suggested set of values, a projection of the random sample from within the ball onto a feasible set of values for the one or more adjustable parameters.

The operations can further include receiving a result obtained through evaluation of the suggested set of values. The operations can further include comparing the result to a best observed result obtained through evaluation of the best observed set of values to determine whether to update the best observed set of values to equal the suggested set of values.

The operations can further include determining, according to a user-defined probability, whether to select a random sample from a feasible set of values for the one or more adjustable parameters as the suggested set of values rather than determine the suggested set of values based at least in part on the random sample from within the ball.

Another aspect of the present disclosure is directed to a computer-implemented method to perform black box optimization. The method includes performing, by one or more computing devices, a plurality of suggestion rounds to respectively suggest a plurality of suggested sets of values for one or more adjustable parameters. Performing each suggestion round includes determining, by the one or more computing devices, whether to perform a random sampling technique or a ball sampling technique. Performing each suggestion round includes, when it is determined to perform the random sampling technique: determining, by the one or more computing devices, a random sample from a feasible set of values for the one or more adjustable parameters; and selecting, by the one or more computing devices, the random sample as the suggested set of values for the one or more adjustable parameters for the current suggestion round. Performing each suggestion round includes, when it is determined to perform the ball sampling technique: determining, by the one or more computing devices, a radius; generating, by the one or more computing devices, a ball that has the radius around a best observed set of values for the one or more adjustable parameters; determining, by the one or more computing devices, a random sample from within the ball; and determining, by the one or more computing devices, the suggested set of values for the current suggestion round based at least in part on the random sample from within the ball.

Determining, by the one or more computing devices, the radius can include randomly sampling, by the one or more computing devices, the radius from within a geometric series.

Determining, by the one or more computing devices, the radius can include determining, by the one or more computing devices, the radius based at least in part on a user-defined resolution term.

Determining, by the one or more computing devices, the radius can include randomly sampling, by the one or more computing devices, the radius from a distribution of available radii that has a minimum equal to a user-defined resolution term.

Determining, by the one or more computing devices, the radius can include randomly sampling, by the one or more computing devices, the radius from a distribution of available radii that has a maximum that is based at least in part on a diameter of a feasible set of values for the one or more adjustable parameters.

Determining, by the one or more computing devices, the suggested set of values for the one or more adjustable parameters based at least in part on the random sample from within the ball can include selecting, by the one or more computing devices as the suggested set of values, a projection of the random sample from within the ball onto a feasible set of values for the one or more adjustable parameters.

Performing each suggestion round can further include receiving, by the one or more computing devices, a result obtained through evaluation of the suggested set of values. Performing each suggestion round can further include comparing the result to a best observed result obtained through evaluation of the best observed set of values to determine whether to update the best observed set of values to equal the suggested set of values.

Determining, by the one or more computing devices, whether to perform the random sampling technique or the ball sampling technique can include determining, by the one or more computing devices, whether to perform the random sampling technique or the ball sampling technique according to a predefined probability.

Determining, by the one or more computing devices, whether to perform the random sampling technique or the ball sampling technique can include determining, by the one or more computing devices, whether to perform the random sampling technique or the ball sampling technique according to a user-defined probability.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
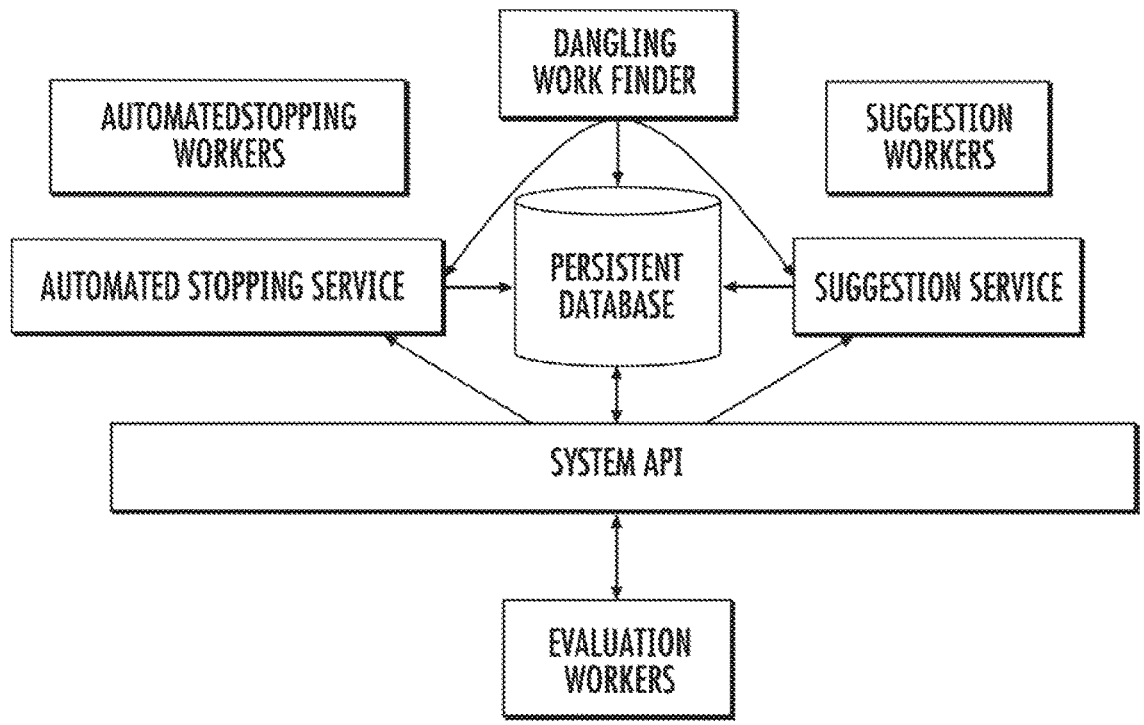
FIG. 1 depicts a block diagram of an example computing system architecture according to example embodiments of the present disclosure.

Black box optimization can be used to find the best operating parameters for any system, product, or process whose performance can be measured or evaluated as a function of those parameters. It has many important applications. For instance, it may be used in the optimization of physical systems and products, such as the optimization of the configuration of aero-foils (e.g., optimizing airfoil shapes based on computer simulations of flight performance) or the optimization of the formulation of alloys or metamaterials. Other uses include the optimization (or tuning) of hyperparameters of machine learning systems, such as learning rates or the number of hidden layers in a deep neural network.

Two important considerations with respect to black-box optimization are the performance of the optimization and the expenditure of resources (e.g., computational resources) required to perform the optimization. With regard to resources, these may be expended as a result of the function evaluations (that is the evaluation of the performance of a particular variant of the system, product, or process as defined by a particular set of parameters) or as a result of the execution of the optimization algorithm for determining a next set of parameters for use in the next performance evaluation.

Described herein are computing systems and associated methods which may serve to reduce the expenditure of resources when performing optimization of the parameters of a system, product, or process. Various aspects (including those relating to early-stopping and the ability to override system-suggested parameters) may serve to reduce resource expenditure resulting from function evaluation, while others (for instance those relating to the "Gradientless Descent" optimization algorithm provided by the present disclosure) may serve to reduce computational resource expenditure resulting from execution of the optimization algorithm.

More generally, the present disclosure is directed to computing systems and associated methods for optimizing one or more adjustable parameters (e.g. operating parameters) of a system. In particular, the present disclosure provides a parameter optimization system that can perform one or more black-box optimization techniques to iteratively suggest new sets of parameter values for evaluation. The system can interface with a user device to receive results obtained through the evaluation of the suggested parameter values by the user. Alternatively or additionally, the parameter optimization system can provide an evaluation service that evaluates the suggested parameter values using one or more evaluation devices. Through the use of black-box optimization techniques, the system can iteratively suggest new sets of parameter values based on the returned results. The iterative suggestion and evaluation process can serve to optimize or otherwise improve the overall performance of the system, as evaluated by an objective function that evaluates one or more metrics.

In some implementations, the parameter optimization system of the present disclosure may utilize a novel parameter optimization technique provided herein which is referred to as "Gradientless Descent." Gradientless Descent, which is discussed in more detail below, provides a mix between the benefits of truly random sampling and random sampling near a best observed set of parameter values to date. Gradientless Descent also converges exponentially fast under relatively weak conditions and is highly effective in practice. By converging fast, it is possible to reach an acceptable degree of optimization in fewer iterations, thereby reducing the total computation associated with the optimization. Moreover, because Gradientless Descent is a relatively simple algorithm, the computational resources required to execute the algorithm are low, particularly when compared with alternative, more complex optimization approaches such as Bayesian Optimization. In addition, as is explained in more detail below, under certain conditions, the performance of Gradientless Descent may dominate that of Bayesian Optimization, despite its simplicity. As such, Gradientless Descent may provide both improved optimization and reduced computational resource expenditure, when compared with alternative approaches such as Bayesian Optimization.

The parameter optimization system of the present disclosure can be employed to simultaneously optimize or otherwise improve adjustable parameters associated with any number of different systems including, for example, one or more different models, products, processes, and/or other systems. In particular, in some implementations, the parameter optimization system can include or provide a service that allows users can to create and run "studies" or "optimization procedures". A study or optimization procedure can include a specification of a set of adjustable parameters that affect the quality, performance, or outcome of a system. A study can also include a number of trials, where each trial includes a defined set of values for the adjustable parameters together with the results of conducting the trial (once available). The results of a trial can include any relevant metric that describes the quality, performance, or outcome of the system (e.g., in the form of the objective function) that results from use of the set of values defined for such trial. Put another way, each trial may correspond to a particular variant of the model, product, process, or system as defined by the set of values for the adjustable parameters. The results of the trial may include a performance evaluation (or a performance measure) of the variant to which the trial relates.

In one particular example application, the parameter optimization system can be employed to optimize the parameters of a machine-learned model such as, for example, a deep neural network. For example, the adjustable parameters of the model can include hyperparameters such as, for example, learning rate, number of layers, number of nodes in each layer, etc. Through the use of black-box optimization technique(s), the parameter optimization system can iteratively suggest new sets of values for the model parameters to improve the performance of the model. For example, the performance of the model can be measured according to different metrics such as, for example, the accuracy of the model (e.g., on a validation data set or testing data set).

In another example application, the parameter optimization system can be employed to optimize the adjustable parameters (e.g., component or ingredient type or amount, production order, production timing) of a physical product or process of producing a physical product such as, for example, an alloy, a metamaterial, a concrete mix, a process for pouring concrete, a drug cocktail, or a process for performing therapeutic treatment. Additional example applications include optimization of the user interfaces of web services (e.g. optimizing colors and fonts to maximize reading speed) and optimization of physical systems (e.g., optimizing airfoils in simulation).

As another example, in some instances, an experiment such as a scientific experiment with a number of adjustable parameters can be viewed as a system or process to be optimized.

More generally, the parameter optimization system and associated techniques provided herein can be applied to a wide variety of products, including any system, product, or process that can be specified by, for example, a set of components and/or operating/processing parameters. Thus, in some implementations, the parameter optimization system can be used to perform optimization of products (e.g., personalized products) via automated experimental design.

According to an aspect of the present disclosure, the parameter optimization system can perform a black-box optimization technique to suggest a new set of parameter values for evaluation based on the previously evaluated sets of values and their corresponding results associated with a particular study. The parameter optimization system of the present disclosure can use any number of different types of black-box optimization techniques, including the aforementioned novel optimization technique provided herein which is referred to as "Gradientless Descent."

Black-box optimization techniques make minimal assumptions about the problem under consideration, and thus are broadly applicable across many domains. Black-box optimization has been studied in multiple scholarly fields under names including Bayesian Optimization (see, e.g., Bergstra et al. 2011. Algorithms for hyper-parameter optimization. In *Advances in Neural Information Processing Systems.* 2546-2554; Shahriari et al. 2016. Taking the human out of the loop: A review of Bayesian optimization. *Proc. IEEE* 104, 1 (2016), 148-175; and Snoek et al. 2012. Practical Bayesian optimization of machine learning algorithms. In *Advances in neural information processing systems.* 2951-2959); Derivative-free optimization (see, e.g., Conn et al. 2009. *Introduction to derivative-free optimization.* SIAM; and Rios and Sahinidis. 2013. Derivative-free optimization: a review of algorithms and comparison of software implementations. *Journal of Global Optimization* 56, 3 (2013), 1247-1293), Sequential Experimental Design (see, e.g., Chernoff. 1959. Sequential Design of Experiments. *Ann. Math. Statist.* 30, 3 (09 1959), 755-770); and assorted variants of the multiarmed bandit problem (see, e.g., Ginebra and Clayton. 1995. Response Surface Bandits. *Journal of the Royal Statistical Society. Series B (Methodological)* 57, 4 (1995), 771-784; Li et al. 2016. Hyperband: A Novel Bandit-Based Approach to Hyperparameter Optimization. *CoRR* abs/1603.06560 (2016); and Srinivas et al. 2010. Gaussian Process Optimization in the Bandit Setting: No Regret and Experimental Design. *ICML* (2010)).

Several classes of algorithms are included under the umbrella of black-box optimization techniques. The simplest of these are non-adaptive procedures such as Random Search, which selects $x_t$ uniformly at random from X at each time step t independent of the previous points selected, $x_\tau: 1 \leq \tau < t$, and Grid Search, which selects along a grid (e.g., the Cartesian product of finite sets of feasible values for each parameter). Classic algorithms such as Simulated Annealing and assorted genetic algorithms have also been investigated, including, for example, Covariance Matrix Adaptation (Hansen et al., 1996, Adapting Arbitrary Normal Mutation Distributions in Evolution Strategies: The Covariance Matrix Adaptation, *Proc. IEEE (ICEC '96)*, 312-317).

Another class of black-box optimization algorithms performs a local search by selecting points that maintain a search pattern, such as a simplex in the case of the classic Nelder-Mead algorithm (Nelder and Mead. 1965. A simplex method for function minimization. *The Computer Journal* 7, 4 (1965), 308-313). More modern variants of these algorithms maintain simple models of the objective $f$ within a subset of the feasible regions (called the trust region), and select a point $x_t$ to improve the model within the trust region (see, e.g., Conn et al. 2009. *Introduction to derivative free optimization*. SIAM).

More recently, some researchers have combined powerful techniques for modeling the objective $f$ over the entire feasible region, using ideas developed for multiarmed bandit problems for managing explore/exploit trade-offs. These approaches are fundamentally Bayesian in nature, hence this literature goes under the name Bayesian Optimization. Typically, the model for $f$ is a Gaussian process (e.g., as in Snoek et al. 2012. Practical Bayesian optimization of machine learning algorithms. *Advances in neural information processing systems*, 2951-2959; and Srinivas et al. 2010. Gaussian Process Optimization in the Bandit Setting: No Regret and Experimental Design. *ICML* (2010)); a deep neural network (e.g., as in Snoek et al. 2015. Scalable Bayesian Optimization Using Deep Neural Networks. *Proceedings of the 32nd International Conference on Machine Learning, ICML* 2015, Lille, France, 6-11 Jul. 2015, Vol. 37, 2171-2180; and Wilson et al. 2016. Deep kernel learning. *Proceedings of the 19th International Conference on Artificial Intelligence and Statistics*, 370-378); or a regression forest (e.g., as in Bergstra et al. 2011. Algorithms for hyperparameter optimization. *Advances in Neural Information Processing Systems*, 2546-2554; and Hutter et al. 2011. Sequential model-based optimization for general algorithm configuration. *International Conference of Learning and Intelligent Optimization*, Springer, 507-523). The parameter optimization system of the present disclosure can perform or support performance of any of the optimization techniques described above in addition to other black box optimization techniques not specifically identified.

Many of these black-box optimization algorithms have open-source implementations available. Within the machine learning community, open sourced examples include Hyper-Opt, Metric Optimization Engine (MOE), Spearmint, and AutoWeka, among others.

In contrast to such software packages, which require practitioners to set up and run them locally, the system of the present disclosure provides a managed service for black-box optimization, which is more convenient for users but also involves additional design considerations. In particular, the parameter optimization system of the present disclosure can include a unique architecture which features a convenient Remote Procedure Call (RPC) and can support a number of advanced features such as transfer learning, automated early stopping, dashboard and analysis tools, and others, as will be described in further detail below.

As one example of such advanced features, according to an aspect of the present disclosure, the parameter optimization system can enable or perform dynamic switching between optimization algorithms during optimization of a set of system parameters. For example, the system can dynamically change black-box optimization techniques between at least two of the plurality of rounds of generation of suggested trials, including while other trials are ongoing.

In particular, in some implementations, some or all of the supported black-box optimization techniques can be stateless in nature so as to enable such dynamic switching. For example, in some implementations, the optimization algorithms supported by the parameter optimization system can be computed from or performed relative to the data stored in the system database, and nothing else, where all state is stored in the database. Such a configuration provides a major operational advantage: the state of the database can be changed (e.g., changed arbitrarily) and then processes, algorithms, metrics, or other methods can be performed "from scratch" (e.g., without relying on previous iterations of the processes, algorithms, metrics, or other methods).

In some implementations, the switch between optimization algorithms can be automatically performed by the parameter optimization system. For example, the parameter optimization system can automatically switch between two or more different black box optimization techniques based on one or more factors, including, for example: a total number of trials associated with the study; a total number of adjustable parameters associated with the study; and a user-defined setting indicative of a desired processing time. As an example, a first black-box optimization technique may be superior when the number of previous trials to consider is low, but may become undesirably computationally expensive when the number of trials reaches a certain number; while a second black-box optimization technique may be superior (e.g., because it is less computationally expensive) when the number of previous trials to consider is very high. Thus, in one example, when the total number of trials associated with the study reaches a threshold amount, the parameter optimization system can automatically switch from use of the first technique to use of the second technique. More generally, the parameter optimization system can continuously or periodically consider which of a plurality of available black-box optimization techniques is best suited for performance of the next round of suggestion, given the current status of the study (e.g., number of trials, number of parameters, shape of data and previous trials, feasible parameter space) and any other information including user-provided guidance about processing time/expenditure or other tradeoffs. Thus, a partnership between a human user and the parameter optimization system can guide selection of the appropriate black-box optimization technique at each instance of suggestion.

In addition or alternatively to automatic switching between optimization algorithms, the parameter optimization system can support manual switching between optimization algorithms. Thus, a user of the system can manually specify which of a number of available techniques should be used for a given round of suggestion.

According to another aspect of the present disclosure, the parameter optimization system can provide the ability to override a suggested trial provided by the system with changes to the suggested trial. That is, the parameter optimization system can provide a suggested set of values for the adjustable parameters of the study, and then receive and accept an adjustment to the suggested trial from a user, where the adjustment includes at least one change to the suggested set of values to form an adjusted set of values. The user can provide a result obtained through evaluation of the adjusted set of values and the new result and the adjusted set of values can be associated with the study as a completed trial.

Providing the ability to adjust a suggested trial enables a user to modify the suggested trial when, for any reason, the user is aware that the suggested trial will not provide a positive result or is otherwise infeasible or impractical to evaluate. For example, based on experience the user may be aware that the suggested trial will not provide a positive result. The user can adjust the suggested trial to provide an adjusted trial that is more likely to provide an improved result. The ability to adjust a suggested trial can save time and computation expense as suggested trials that are known ex ante to correspond to poor results are not required to be evaluated and, in fact, can be replaced with more useful adjusted trials. As another example benefit, suggested trials that would require substantial time or expenditure of computational resources to evaluate (e.g., due to the particular parameter value provided by the suggested trial) are not required to be evaluated and, in fact, can be replaced with adjusted trials that are less computationally expensive to evaluate. Thus, again, the parameter optimization system can enable and leverage a partnership between a human user and the parameter optimization system to improve computational resource expenditure, time or other attributes of the suggestion/evaluation process.

In some studies, it may be possible to know (e.g., after the experiment is started or completed) the parameter values that were used in a Trial, yet it may not be practical to precisely control said parameters. One example happens in mixed-initiative systems, where the parameter optimization system would suggest experiments (e.g. recipes) to a human (e.g., human chef), and the human has the right to modify the experiment (e.g., recipe) so long as he/she reports what was actually evaluated (e.g., cooked).

According to another aspect of the present disclosure, the parameter optimization system can provide the ability to change a feasible set of parameter values for one or more of the adjustable parameters while a study is pending. Thus, should new information come to light or new judgments be made about the feasible set of values for a particular parameter, the parameter optimization system can support changes to the feasible set of values by a user, while a study is pending.

According to yet another aspect of the present disclosure, the parameter optimization system can provide the ability to ask for additional suggestions at any time and/or report back results at any time. Thus, in some implementations, the parameter optimization system can support parallelization and/or be designed asynchronously.

In some implementations, the parameter optimization system can perform batching of requests for and provision of suggestions. Thus, the system can batch at least a portion of a plurality of requests for additional suggested trials and, in response, generate the additional suggested trials as a batch. For example, fifty computing devices can collectively make a single request for fifty suggestions which can be generated in one batch.

More particularly, in some instances it may be desired for the system to suggest multiple trials to run in parallel. The multiple trials should collectively contain a diverse set of parameter values that are believed to provide "good" results. Performing such batch suggestion requires the parameter optimization system to have some additional algorithmic sophistication. That is, instead of simply picking the "best" single suggestion (e.g., as provided by a particular black-box optimization technique based on currently available results), the parameter optimization system can provide multiple suggestions that do not contain duplicates or that are otherwise intelligently selected relative to each other. For example, in some implementations, suggested trials can be conditioned on pending trials or other trials that are to be suggested within the same batch.

As one example, in some implementations, the parameter optimization system can hallucinate or synthesize poor results for pending trials or other trials that are to be suggested within the same batch, thereby guiding the black-box optimization technique away from providing a duplicate suggestion. In some implementations, the "hallucinated" results are temporary and transient. That is, each hallucinated value may last only from the moment a Trial is suggested to the moment the evaluation is complete. Thus, in some implementations, the hallucinations can exist solely to reserve some space, and to prevent another, very similar Trial from being suggested nearby, until the first one is complete.

In addition, in some implementations, the multiple suggestions provided by the parameter optimization system can lead to more specific and precise evaluation of a particular adjustable parameter. For example, in some implementations, some or all but one of the adjustable parameters can be constrained (e.g., held constant or held within a defined sub-range) while multiple suggested values are provided for the non-constrained parameter(s). In such fashion, trials can be suggested that help to identify data around a particular parameter or a particular relationship between two or more parameters. The selection of constrained versus non-constrained parameters can be user-guided or automatically selected based on the results of previous trials.

According to another aspect of the present disclosure, the parameter optimization system can perform or support early stopping of pending trials. For example, the system can implement or otherwise support use of one or more automated stopping algorithms that evaluate the intermediate statistics (e.g., initial results) of a pending trial to determine whether to perform early stopping of the trial, thereby saving resources that would otherwise be consumed by completing a trial that is not likely to provide a positive result. As one example, the system can implement or otherwise support use of a performance curve stopping rule that performs regression on a performance curve to make a prediction of the final result (e.g., objective function value) of a trial. In particular, while certain existing early stopping techniques use parametric regression, the performance curve stopping rule provided by the present disclosure is unique in that is uses non-parametric regression.

Put in other terms, the parameter optimization system can provide the ability to receive one or more intermediate evaluations of performance of the suggested variant (or trial), the intermediate evaluations having been obtained from an ongoing evaluation of the suggested variant. Based on the intermediate evaluations and prior evaluations in respect of prior variants (or trials), non-parametric regression may be performed in order to determine whether to perform early-stopping of the ongoing evaluation of the suggested variant. In response to determining that early-stopping is to be performed, early-stopping of the ongoing evaluation may be caused or an indication that early-stopping should be performed may be provided.

As already mentioned, the ability of the system to perform early stopping may reduce the expenditure of computational resources that are associated with continuing the performance of on-going variant evaluations which are determined to be unlikely to ultimately yield a final performance evaluation that is in excess of a current-best performance evaluation. Indeed, the non-parametric early stopping described herein has been found to achieve optimality gaps, when tuning hyper-parameters for deep neural networks, that are comparable to those achieved without making use of early stopping, while using approximately 50% fewer CPU hours.

More specifically, performing non-parametric regression to determine whether to perform early-stopping of the ongoing evaluation of the suggested variant can include determining, based on the non-parametric regression, a probability of a final performance of the suggested variant exceeding a current best performance as indicated by one of the prior evaluations of performance of a prior variant. In some implementations, the determination as to whether to perform early-stopping may then be performed based on a comparison of the determined probability with a threshold.

Performance of non-parametric regression to determine whether to perform early-stopping of the ongoing evaluation of the suggested variant can include measuring a similarity between a performance curve that is based on the intermediate evaluations and a performance curve corresponding to performance of a current best variant that is based on the prior evaluation for the current best variant.

According to yet another aspect of the present disclosure, the parameter optimization system can perform or support transfer learning between studies. In particular, the parameter optimization system of the present disclosure can support a form of transfer learning that allows user to leverage data from prior studies to guide and accelerate their current study. As an example, in some implementations, the system can employ a novel transfer learning process that includes building a plurality of Gaussian Process regressors respectively for a plurality of previously conducted studies that are organized into a sequence (e.g., a temporal sequence). In particular, the Gaussian Process regressor for each study can be trained on one or more residuals relative to the Gaussian Process regressor for the previous study in the sequence. This novel transfer learning technique ensures a certain degree of robustness since badly chosen priors will not harm the prediction asymptotically. The transfer learning capabilities described herein can be particularly valuable when the number of trials per study is relatively small, but there are many of such studies.

According to another aspect of the present disclosure, the parameter optimization system can provide a mechanism, referred to herein as an "algorithm playground," for advanced users to easily, quickly, and safely replace the core optimization algorithms supported by the system with arbitrary algorithms supported by the user. The algorithm playground allows users to inject trials into a study. More specifically, the algorithm playground can include an internal abstract policy that interfaces with a custom policy provided by a user. Thus, in some implementations, the parameter optimization system can request, via an internal abstract policy, generation of the suggested trial by the external custom policy provided by the user. The parameter optimization system can then receive a suggested trial from the external custom policy, thereby allowing a user to employ any arbitrary custom policy to provide suggested trials which will be incorporated in the study.

According to yet another aspect of the present disclosure, the parameter optimization system can include a dashboard and analysis tools. The web-based dashboard can be used for monitoring and/or changing the state of studies. The dashboard can be fully featured and implement the full functionality of a system API. The dashboard can be used for tracking the progress of the study; interactive visualizations; creating, update, and/or deleting a study; requesting new suggestions, early stopping, activating/deactivating a study; or other actions or interactions. As one example, the interactive visualizations accessible via the dashboard can include a parallel coordinates visualization that visualizes the one or more results relative to the respective values for each parameter dimension that are associated with the completed trials.

The parameter optimization system of the present disclosure also has the benefit of enabling post-facto tuning of black-box optimization algorithms. In particular, in the event that users provide consent for use of their study data, data from a significant number of studies can be used to tune different optimization techniques or otherwise evaluate the outcomes from use of such different optimization techniques, thereby enabling a post-hoc evaluation of algorithm performance.

According to another aspect of the present disclosure, in some example applications the parameter optimization system can be employed to not only generally optimize a system such as a product or process, but can be used to optimize the system relative to a particular application or particular subset of individuals. As an example, a study can be performed where the results are limited to feedback from or relative to a particular scenario, application, or subset of individuals, thereby specifically optimizing the system for such particular scenario, application, or subset of individuals.

To provide an example, as described above, the parameter optimization system can be used to generally optimize the adjustable parameters of a process of pouring concrete (e.g., ingredient type or volume, ordering, timing, operating temperatures, etc.). In addition, by limiting the trials and/or the evaluation thereof to a particular scenario (e.g., ambient temperature conditions between 60 degrees and 65 degrees Fahrenheit; elevation between 1250 feet and 1350 feet; surrounding soil conditions of a certain type; etc.) the adjustable parameters of the concrete pouring process can be optimized relative to such particular scenario. To provide another example, the adjustable parameters of a user interface (e.g., font, color, etc.) can be optimized relative to a specific subset of users (e.g., engineers that live in Pittsburgh, Pa.). Thus, in some implementations, the parameter optimization system can be used to perform personalized or otherwise specialized optimization of systems such as products or processes.

As already mentioned, the present disclosure provides a novel black-box optimization technique which is referred to herein as "Gradientless Descent."

In particular, in some implementations, the Gradientless Descent technique can be employed (e.g., by the parameter optimization system) in an iterative process that includes a plurality of rounds of suggestion and evaluation. More particularly, each suggestion round can result in a suggested set of parameter values (e.g., a suggested trial/variant), which may be defined by a sampled "argument value". Thus, a single iteration of Gradientless Descent can be performed to obtain a new suggestion (e.g., suggested variant/trial). However, as with most black-box optimization techniques, multiple iterations of suggestion and evaluation (e.g., reporting of results) are used to optimize the objective function.

In some implementations, at each iteration, the Gradientless Descent technique can include a choice between a random sampling technique or a ball sampling technique. In the random sampling technique, a random sample is determined from a feasible set of values for the one or more adjustable parameters. In the ball sampling technique, a ball is formed around a best observed set of values and a random sample can be determined from within the ball. In particular, the ball can be localized around the current best argument value and can define a boundary of a subset of the feasible set from which sampling is performed in the ball sampling approach.

In some implementations, the choice between the random sampling technique or the ball sampling technique can be performed with or otherwise guided by a predefined probability. For example, the random sampling technique can be selected with some probability while the ball sampling technique is selected with the inverse probability. In some implementations, the probability is user-defined. In some implementations, the probability is fixed while in other implementations the probability changes as iterations of the technique are performed (e.g., increasingly weighted towards the ball sampling technique over time). In some implementations, the probability can be adaptive or otherwise responsive to outcomes (e.g., trial results).

According to another aspect, a radius of the ball can be determined at each iteration in which the ball sampling technique is performed. In particular, in some implementations, the radius of the ball can be selected (e.g., randomly sampled) from a novel distribution of available radii. For example, in some implementations, the distribution of radii can be a geometric series or other power-law step-size distribution. In some implementations, the distribution of available radii can be based on a user-defined resolution term. For example, in some implementations, the distribution of available radii has a minimum equal to the user-defined resolution term. In some implementations, the distribution of available radii has a maximum that is based at least in part on a diameter of a feasible set of values for the one or more adjustable parameters.

According to another aspect, the selection from the ball (e.g., the random sample from the ball) can be projected onto the feasible set of values for the one or more adjustable parameters. Thus, if the selection from the ball (e.g., the random sample from the ball) is not included within the available space of parameter values, then it can be projected back into the space to provide a suggested set of values for evaluation. Thus, for the ball sampling technique, the projection of the selection from within the ball onto the feasible parameter space can be output as the suggestion to be evaluated.

Put in other terms, the Gradientless Descent technique for black box optimization of parameters of a system, product, or process can include performing one or more iterations of a sequence of operations and, after completion of a final iteration of the sequence, outputting values of the parameters defined by a current best argument value for use in configuration of the system, formulation of the product or execution of the process.

The sequence of operations can include: a) determining whether to sample an argument value from a feasible set of argument values using a first approach (also referred to as random sampling) or a second approach (also referred to as ball sampling), where each argument value of the feasible set defines values for each of plural parameters of a system, product, or process; b) based on the determination, sampling the argument value using the first (random sampling) approach or the second (ball sampling) approach, wherein the first approach includes sampling the argument value at random from the entire feasible set and the second approach includes sampling the argument value from a subset of the feasible set that is defined based on a ball around a current best argument value; c) determining whether a performance measure of the system, product, or process that has been determined using parameters defined by the sampled argument value is closer-to-optimal than a current closest-to-optimal performance measure; and d) if the performance measure of the system is closer-to-optimal than the current closest-to-optimal performance measure, updating the current best argument value based on the sampled argument value.

In some implementations, the ball may be defined by a radius that is selected from a geometric series of possible radii. In some of such implementations, the radius of the ball may be selected at random from the geometric series of radii. In addition or alternatively, an upper limit on the geometric series of radii may be dependent on the diameter of the dataset, a resolution of the dataset, and/or the dimensionality of the objective function.

The determination between the sampling of the argument value using the first approach and the sampling of the argument value using the second approach may be performed probabilistically (or may have an associated probability mass function). In addition or alternatively, sampling the argument value using the second approach can include determining an argument value from a space bounded by a ball around a current best argument value, and projecting the determined argument value onto the feasible set of argument values, thereby to obtain the sampled argument value.

Thus, the present disclosure provides a computer system that can implement one or more black-box optimization techniques to iteratively suggest new parameter values to evaluate in order to optimize the performance of a system. Many advanced features and particular applications have been introduced and will be described further below. In addition, the present disclosure provides a novel optimization technique and includes mathematical and practical evaluation of the novel technique.

With reference now to the Figures, example embodiments of the present disclosure will be discussed in further detail.

1. Example Terms

Throughout the present disclosure, the following example terms are used to describe the semantics of the system:

A Trial is a list of parameter values, x, that will lead to a single evaluation of $f(x)$. A trial can be "Completed", which means that it has been evaluated and the objective value $f(x)$ has been assigned to it, otherwise it is "Pending". Thus, a trial can correspond to an evaluation that provides an associated measure of performance of a system given a particular set of parameter values.

In some instances, a Trial can also be referred to as an experiment in the sense that the evaluation of a list of parameter values, x, can be viewed as a single experiment regarding the performance of the system. This usage should not be confused however, with application of the systems and methods described herein to optimize the adjustable parameters of an experiment such as a scientific experiment.

A Study represents a single optimization run over a feasible space. Each Study contains a configuration describing the feasible space, as well as a set of Trials. It is assumed that $f(x)$ does not change in the course of a Study.

A Worker can refer to a process responsible for evaluating a Pending Trial and calculating its objective value. Such processes can be performed by "worker computing device(s)".

These example terms are used for simplicity and for the purposes of illustrating example aspects of the present disclosure. Other terms could be used instead and the present disclosure is limited to neither the particular example terms nor their explanations provided above.

2. Overview of Example System

Implementing black-box optimization as a service can involve several design considerations, examples of which will be provided below.

2.1 Example Design Objectives and Constraints

The parameter optimization system of the present disclosure satisfies the following desiderata:
  Ease of use: Minimal user configuration and setup;
  Hosts state-of-the-art black-box optimization algorithms;
  High availability;
  Scalable to millions of trials per study, thousands of parallel trial evaluations per study, and billions of studies;
  Easy to experiment with new algorithms; and
  Easy to change out algorithms deployed in production.

In some implementations of the present disclosure, the parameter optimization system of the present disclosure can be implemented as a managed service that stores the state of each optimization. This approach drastically reduces the effort a new user needs to get up and running; and a managed service with a well-documented and stable RPC API allows the service to be upgraded without user effort. A default configuration option can be provided for the managed service that is good enough to ensure that most users need never concern themselves with the underlying optimization algorithms.

The use of a default option can allow the service to dynamically select a recommended black-box algorithm along with low-level settings based on the study configuration. The algorithms can be made stateless, so that the system can seamlessly switch between algorithms during a study, if and when the system determines that a different algorithm is likely to perform better for a particular study. For example, Gaussian Process Bandits provide excellent result quality (see, e.g., Snoek et al. 2012. Practical Bayesian optimization of machine learning algorithms. In *Advances in neural information processing systems.* 2951-2959; and Srinivas et al. 2010. Gaussian Process Optimization in the Bandit Setting: No Regret and Experimental Design. *ICML* (2010)), but naive implementations scale as $O(n^3)$ with the number of training points. Thus, once a large number of completed Trials have been collected, the system can switch (e.g., automatically or in response to a user input) to using a more scalable algorithm.

At the same time, it is desirable to allow the freedom to experiment with new algorithms or special-case modifications of the supported algorithms in a manner that is safe, easy, and fast. Towards these ends, the present disclosure can be built as a modular system consisting of four cooperating processes (see, e.g., FIG. 1 which is described in further detail below) that update the state of Studies in the central database. The processes themselves are modular with several clean abstraction layers that allow experimenting with and applying different algorithms easily.

Finally, it is desirable to allow multiple trials to be evaluated in parallel, and allow for the possibility that each trial evaluation could itself be a distributed process. To this end Workers can be defined, which can be responsible for evaluating suggestions, and can be identified by a persistent name (a worker_handle) that persists across process preemptions or crashes.

2.2 Example Basic User Workflow

A developer may use one of the client libraries of the parameter optimization system of the present disclosure implemented in multiple programming languages (e.g. C++, Python, Golang, etc.), which can generate service requests encoded as protocol buffers (see, e.g., Google. 2017 b. Protocol Buffers: Google's data interchange format. https://github.com/google/protobuf. (2017). [Online]). The basic workflow is extremely straight-forward. Users can specify a study configuration indicating:
  Identifying characteristics of the study (e.g. name, owner, permissions);
  The set of parameters along with feasible sets for each (c.f., Section 2.3.1 for details); and
  Whether the goal is minimization or maximization of the objective function.

Given this configuration, in some implementations, basic use of the system (with each trial being evaluated by a single process) can be implemented as follows:
\# Register this client with the Study, creating it if necessary.
client.LoadStudy(study_config, worker_handle)
while (not client.StudyIsDone( )):
  \# Obtain a trial to evaluate.
  trial=client.GetSuggestion( )
  \# Evaluate the trial parameters.
  metrics=RunTrial(trial)
  \# Report back the results.
  client.CompleteTrial(trial, metrics)

In some instances, a "client" can refer to or include a communications path to the parameter optimization system and a "worker" can refer to a process that evaluates a Trial. In some instances, each worker has or is a client. Thus, the phrase \# Register this client with the Study, creating it if necessary could also be true if "client" was replaced by "worker." In addition, in some implementations, a copy of the "while" loop from the above example pseudocode is typically running on each worker, of which there could be any number (e.g., 1000 workers).

Further, as used in the above example pseudocode, RunTrial is the problem—specific evaluation of the objective function $f$. Multiple named metrics may be reported back to the parameter optimization system of the present disclosure, however one metric (or some defined combination of the metrics) should be distinguished as the objective value $f(x)$ for trial x. Note that multiple processes working on a study could share the same worker_handle if they are collaboratively evaluating the same trial. Processes registered with a given study with the same worker_handle can receive the same trial upon request, which enables distributed trial evaluation.

2.3 Example Interfaces

2.3.1 Configuring a Study

To configure a study, the user can provide a study name, owner, optional access permissions, an optimization goal from MAXIMIZE, MINIMIZE, and specify the feasible region X via a set of ParameterConfigs, each of which specifies a parameter name along with its feasible values. For instance, the following parameter types can be supported:
  DOUBLE: The feasible region can be a closed interval [a, b] for some real values a≤b.
  INTEGER: The feasible region can have the form [a, b]∩ $\mathbb{Z}$ for some integers a≤b.

DISCRETE: The feasible region can be an explicitly specified set of real numbers. In some implementations, the set of real numbers can be "ordered" in the sense that they are treated differently (e.g., by the optimization algorithms) than categorical features. For example, an optimization algorithm might be able to leverage the fact that 0.2 is between 0.1 and 0.3 in a fashion that is generally not applicable to unordered categories. However, there is no requirement that the set of real numbers be supplied in any particular order or assigned any particular ordering.

CATEGORICAL: The feasible region can be an explicitly specified, unordered set of strings.

Users may also suggest recommended scaling, e.g., logarithmic scaling for parameters for which the objective may depend only on the order of magnitude of a parameter value.

2.3.2 Example API Definition

Workers and end users can make calls to the parameter optimization system of the present disclosure using, for example, a REST API or using an internal RPC protocol (see., e.g., Google. 2017 b. Protocol Buffers: Google's data interchange format. https://github.com/google/protobuf. (2017). [Online]).

For instance, some example system calls are:

CreateStudy: Given a Study configuration, this can create an optimization Study and return a globally unique identifier ("guid") which can be used for all future system calls. If a Study with a matching name exists, the guid for that Study is returned. This can allow parallel workers to call this method and all register with the same Study.

SuggestTrials: This method can take a "worker handle" as input, and return a globally unique handle for a "long-running operation" that can represent the work of generating Trial suggestions. The user can then poll the API periodically to check the status of the operation. Once the operation is completed, it can contain the suggested Trials. This design can ensure that all system calls are made with low latency, while allowing for the fact that the generation of Trials can take longer.

AddMeasurementToTrial: This method can allow clients to provide intermediate metrics during the evaluation of a Trial. These metrics can then be used by the Automated Stopping rules to determine which Trials should be stopped early.

CompleteTrial: This method can change a Trial's status to "Completed", and can provide a final objective value that can then be used to inform the suggestions provided by future calls to SuggestTrials.

ShouldTrialStop: This method can return a globally unique handle for a long-running operation that can represent the work of determining whether a Pending Trial should be stopped.

2.4 Example Infrastructure

FIG. 1 depicts an example computing system architecture that can be used by the parameter optimization system of the present disclosure. In particular, the main components include (1) a Dangling Work Finder that restarts work lost to preemptions; (2) a Persistent Database that holds the current state of all Studies; (3) a Suggestion Service that creates new Trials; (4) an Early Stopping Service that helps terminate a Trial early; (5) a System API that can perform, for example, JSON, validation, multiplexing, etc.; and (6) Evaluation Workers. In some implementations, the Evaluation Workers can be provided and/or owned by the user.

2.4.1 Example Parallel Processing of Suggestion Work

In some implementations, the parameter optimization system of the present disclosure can be used to generate suggestions for a large number of Studies concurrently. As such, a single machine can be insufficient for handling all the workload of the system. The Suggestion Service can therefore be partitioned across several datacenters, with a number of machines being used in each one. Each instance of the Suggestion Service potentially can generate suggestions for several Studies in parallel, giving us a massively scalable suggestion infrastructure. A load balancing infrastructure can then be used to allow clients to make calls to a unified endpoint, without needing to know which instance is doing the work.

When a request is received by a Suggestion Service instance to generate suggestions, the instance can first place a distributed lock on the Study, which can ensure that work on the Study is not duplicated by multiple instances. This lock can be acquired for a fixed period of time, and can periodically be extended by a separate thread running on the instance. In other words, the lock can be held until either the instance fails, or it decides it's done working on the Study. If the instance fails (due to e.g. hardware failure, job preemption, etc.), the lock can expire, making it eligible to be picked up by a separate process (called the "DanglingWorkFinder") which can then reassign the Study to a different Suggestion Service instance.

One consideration in maintaining a production system is that bugs are inevitably introduced as code matures. There are times when a new algorithmic change, however well tested, can lead to instances of the Suggestion Service failing for particular Studies. If a Study is picked up by the DanglingWorkFinder too many times, it can detect this, temporarily halt the Study, and alert an operator to the crashes. This can help prevent subtle bugs that only affect a few Studies from causing crash loops that can affect the overall stability of the system.

2.5 Example Algorithm Playground

In some implementations, the parameter optimization system of the present disclosure can include an algorithm playground which can provide a mechanism for advanced users to easily, quickly, and safely replace the core optimization algorithms internally supported by the parameter optimization system with arbitrary algorithms.

The playground can serve a dual purpose; it can allow rapid prototyping of new algorithms, and it can allow power-users to easily customize the parameter optimization system of the present disclosure with advanced or exotic capabilities that can be particular to a use-case. Thus, users of the playground can benefit from all of the infrastructure of the parameter optimization system aside from the core algorithms, such as access to a persistent database of Trials, the dashboard, and/or visualizations.

One central aspect of the playground is the ability to inject Trials into a Study. The parameter optimization system of the present disclosure can allow the user or other authorized processes to request one or more particular Trials to be evaluated. In some embodiments, the parameter optimization system of the present disclosure may not suggest any Trials for evaluation, but can rely on an external binary to generate Trials for evaluation, which can then be pushed to the system for later distribution to the workers.

In one example embodiment, the architecture of the Playground can involve the following key components: System API, Custom Policy, Abstract Policy, Playground Binary, and Evaluation Workers.

Figure 2:
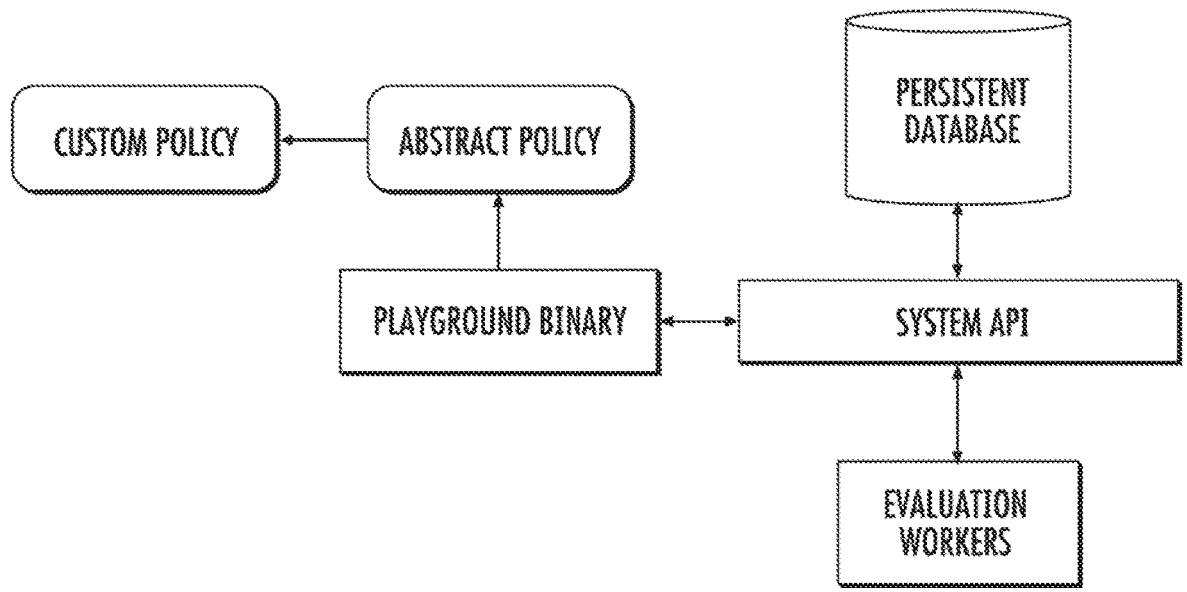
FIG. 2 depicts a block diagram of an example computing system architecture according to example embodiments of the present disclosure.

In particular, FIG. 2 depicts a block diagram of an example computing system architecture that can be used to implement the Algorithm Playground. The main components include: (1) a System API that takes service requests; (2) a Custom Policy that implements the Abstract Policy and generates suggested Trials; (3) a Playground Binary that drives the Custom Policy based on demand reported by the System API; and (4) the Evaluation Workers that behave as normal, such as, requesting and evaluating Trials.

The Abstract Policy can include two abstract methods:
1. GetNewSuggestions(trials, num_suggestions); and
2. GetEarlyStoppingTrials(trials).

The two abstract methods can be implemented by the user's custom policy. Both these methods can be stateless and at each invocation take the full state of all trials in the database, though stateful implementations are within the scope of the present disclosure. GetNewSuggestions can generate, for example, num_suggestions number of new trials, while the GetEarlyStoppingTrials method can return a list of Pending Trials that should be stopped early. The custom policy can be registered with the Playground Binary which can communicate with the System API using a fixed polling schedule. The Evaluation Workers can maintain the service abstraction and can be unaware of the existence of the Playground.

2.6 Example Benchmarking Suite

The parameter optimization system of the present disclosure can include an integrated framework that enable efficiently benchmarking of the supported algorithms on a variety of objective functions. Many of the objective functions come from the Black-Box Optimization Benchmarking Workshop (see Finck et al. 2009. Real-Parameter Black-Box Optimization Benchmarking 2009: Presentation of the Noiseless Functions. http://coco.gforge.inria.fr/lib/exe/fetch.php?media=download3.6:bbobdocfunctions.pdf. (2009). [Online]), but the framework allows for any function to be modeled by implementing an abstract Experimenter class, which can have a virtual method responsible for calculating the objective value for a given Trial, and a second virtual method that can return the optimal solution for that benchmark.

Users can configure a set of benchmark runs by providing a set of algorithm configurations and a set of objective functions. The benchmarking suite can optimize each function with each algorithm k times (where k is configurable), producing a series of performance-over-time metrics which can then be formatted after execution. The individual runs can be distributed over multiple threads and multiple machines, so it is easy to have thousands or more of benchmark runs being executed in parallel.

2.7 Example Dashboard and Visualizations

The parameter optimization system of the present disclosure can include a web dashboard which can be used for monitoring/or and changing the state of Studies. The dashboard can be fully featured and can implement the full functionality of the parameter optimization system API. The dashboard can also be used for: (1) Tracking the progress of a study. (2) Interactive visualizations. (3) Creating, updating and deleting a study. (4) Requesting new suggestions, early stopping, activating/deactivating a study. See FIG. 3 for a section of the dashboard. In addition to monitoring and visualizations, the dashboard can contain action buttons such as Get Suggestions.

Figure 3:
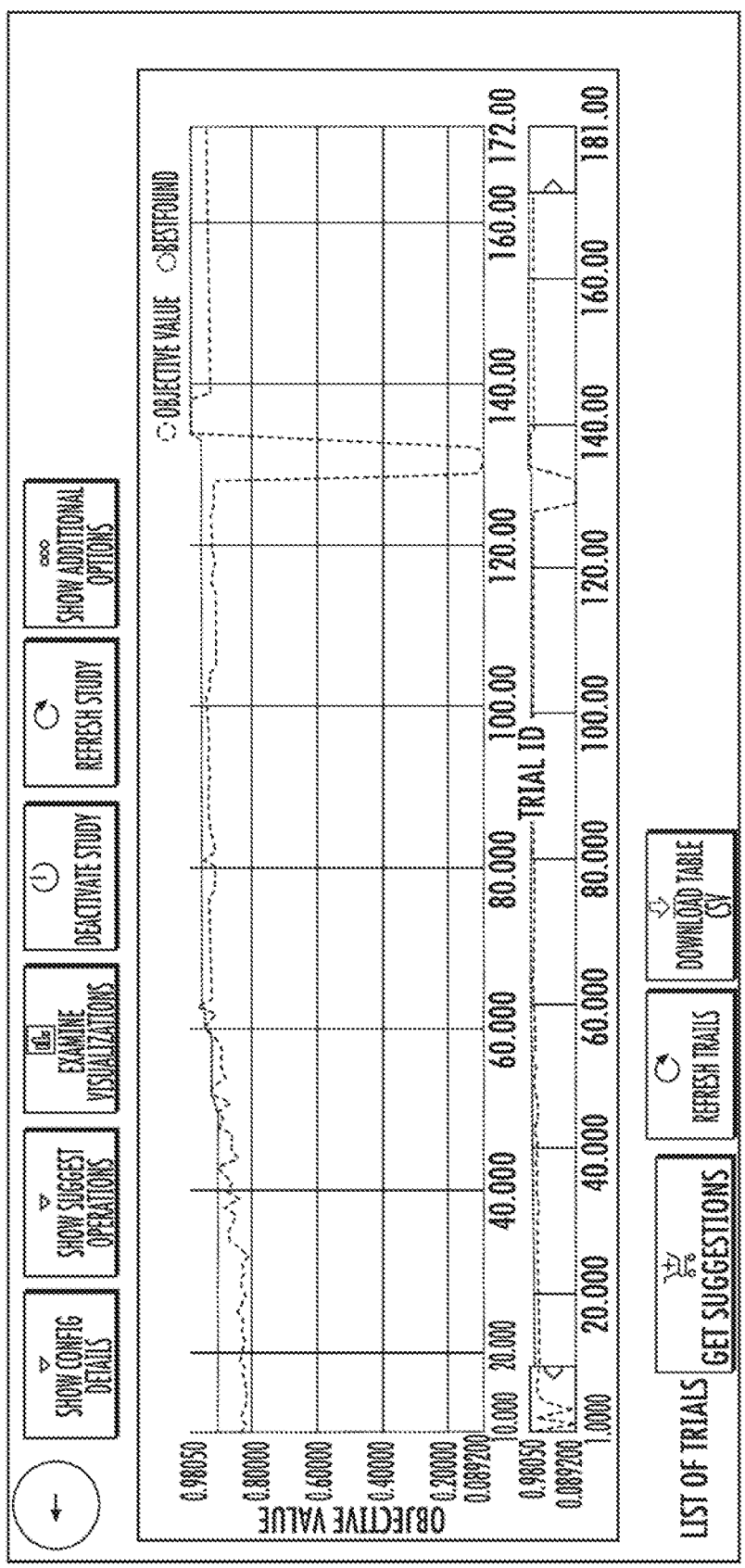
FIG. 3 depicts a graphical diagram of an example dashboard user interface according to example embodiments of the present disclosure.

In particular, FIG. 3 depicts a section of the dashboard for tracking the progress of Trials and the corresponding objective function values. As illustrated, the dashboard also includes actions buttons such as "Get Suggestions" for manually requesting suggestions.

In some implementations, the dashboard can include a translation layer which can convert between JSON and protocol buffers when talking with backend servers (see, e.g., Google. 2017 b. Protocol Buffers: Google's data interchange format. https://github.com/google/protobuf. (2017). [Online]). In some implementations, the dashboard can be built with an open source web framework such as Polymer using web components and can use material design principles (see, e.g., Google. 2017 a. Polymer: Build modern apps. https://github.com/Polymer/polymer. (2017). [Online]). In some implementations, the dashboard can contain interactive visualizations for analyzing the parameters of a study. For instance, a visualization can be used which is easily scalable to high dimensional spaces (e.g., 15 dimensions or more) and works with both numerical and categorical parameters.

One example of such a visualization is the parallel coordinates visualization. See, e.g., Heinrich and Weiskopf. 2013. State of the Art of Parallel Coordinates. In *Eurographics (STARS)*. 95-116.

Figure 4:
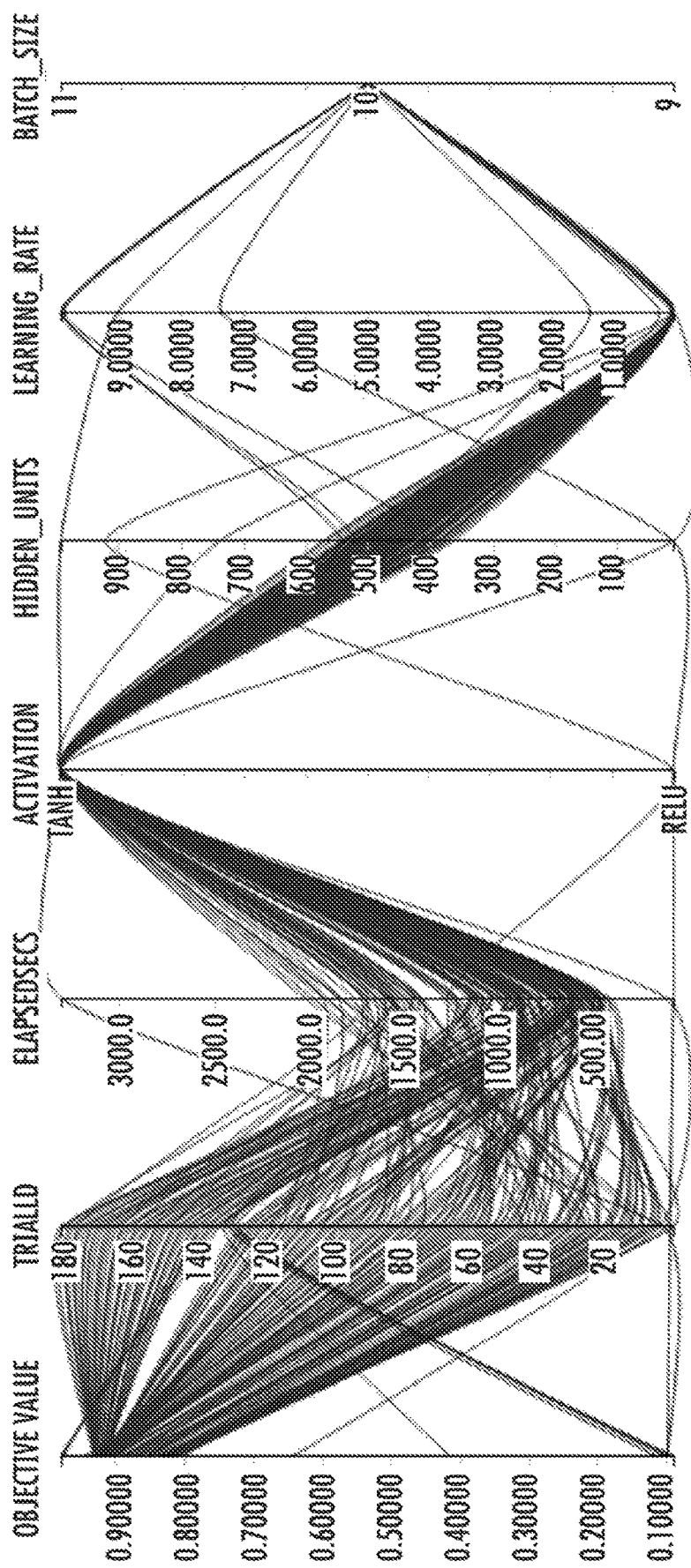
FIG. 4 depicts a graphical diagram of an example parallel coordinates visualization according to example embodiments of the present disclosure.

See FIG. 4 for an example parallel coordinates visualization provided by the parameter optimization system. In one embodiment, each vertical axis can be a dimension corresponding to a parameter, whereas each horizontal line can be an individual trial. The point at which the horizontal line intersects the vertical axis can indicate the value of the parameter in that dimension. This can be used for examining how the dimensions co-vary with each other and also against the objective function value. In some implementations, the visualizations can be built using d3.js (see, e.g., Bostock et al. 2011. $D^3$ data-driven documents. *IEEE transactions on visualization and computer graphics* 17, 12 (2011), 2301-2309).

In particular, FIG. 4 depicts an example parallel coordinates visualization that can be used for examining results from different runs. The parallel coordinates visualization has the benefit of scaling to high dimensional spaces (e.g., ~15 dimensions) and works with both numerical and categorical parameters. Additionally, it can be interactive and can allow various modes of separating, combining, and/or comparing data.

3. Example Parameter Optimization Algorithms

The parameter optimization system of the present disclosure can be implemented using a modular design which can allow the user to easily support multiple algorithms. In some implementations, for studies with under a thousand trials, the parameter optimization system of the present disclosure can default to using Batched Gaussian Process Bandits (see Desautels et al. 2014. Parallelizing exploration-exploitation tradeoffs in Gaussian process bandit optimization. *Journal of Machine Learning Research* 15, 1 (2014), 3873-3923). For example, in some implementations, a Matérn kernel with automatic relevance determination (see e.g., section 5.1 of Rasmussen and Williams. 2005. *Gaussian Processes for Machine Learning (Adaptive Computation and Machine Learning)*. The MIT Press. for a discussion) and the expected improvement acquisition function (see Moc'kus et al. 1978. *The Application of Bayesian Methods for Seeking the Extremum*. Vol. 2. Elsevier. pages 117-128) can be used. In one embodiment, local maxima of the acquisition function can be found with a proprietary gradient-free hill climbing algorithm with random starting points.

In one embodiment, discrete parameters can be incorporated by embedding them in $\mathbb{R}$. Categorical parameters with k feasible values can be represented via one-hot encoding, i.e., embedded in $[0,1]^k$. The Gaussian Process regressor can provide continuous and differentiable function upon which we can walk uphill, then when the walk has converged, round to the nearest feasible point.

In some implementations, Bayesian deep learning models can be used in lieu of Gaussian processes for scalability.

For studies with tens of thousands of trials or more, other algorithms may be used. RandomSearch and GridSearch are supported as first-class choices and may be used in this regime, and many other published algorithms are supported through the algorithm playground. In addition, the example "Gradientless Descent" algorithm described herein and/or variations thereof can be used under these or other conditions instead of the more typical algorithms such as RandomSearch or GridSearch.

For all of these algorithms data normalization can be supported, which can map numeric parameter values into [0,1] and labels onto [−0.5,0.5]. Depending on the problem, a one-to-one nonlinear mapping may be used for some of the parameters, and is typically used on the labels. Data normalization can be handled before trials are presented to the trial suggestion algorithms, and its suggestions can be transparently mapped back to the user-specified scaling.

3.1 Example Automated Early Stopping

In some important applications of black-box optimization, information related to the performance of a trial may become available during trial evaluation. For example, this may take the form of intermediate results. If sufficiently poor, these intermediate results can be used to terminate a trial or evaluation early, thereby saving resources.

Perhaps the best example of such a performance curve occurs when tuning machine learning hyperparameters for models trained progressively (e.g., via some version of stochastic gradient descent). In this case, the model (e.g., as represented by a sequence of trained models) typically becomes more accurate as it trains on more data, and the accuracy of the model is available at the end of each training epoch. Using these accuracy vs. training step curves, it is often possible to determine that a trial's parameter settings are unpromising well before evaluation is finished. In this case trial evaluation can be terminated early, freeing those evaluation resources for more promising trial parameters. When done algorithmically, this is referred to as automated early stopping.

The parameter optimization system of the present disclosure can support automated early stopping via an API call to a ShouldTrialStop method. There can be an Automated Stopping Service similar to the Suggestion Service that can accept requests from the system API to analyze a study and determine the set of trials that should be stopped, according to the configured early stopping algorithm. As with suggestion algorithms, several automated early stopping algorithms can be supported, and rapid prototyping can be done via the algorithm playground.

3.2 Example Performance Curve Stopping Rule

As one example early stopping algorithm, the parameter optimization system of the present disclosure can support a new automated early stopping rule that is based on non-parametric regression (e.g., Gaussian Process regression) with a carefully designed inductive bias. This stopping algorithm can work in a stateless fashion. For example, it can be given the full state of all trials in the Study when determining which trials should stop. The parameter optimization system of the present disclosure can also optionally support any additional early stopping algorithms beyond the example performance curve rule described below.

This stopping rule can perform regression on the performance curves to make a prediction of the final objective value of a Trial given a set of Trials that are already Completed, and a partial performance curve (i.e., a set of measurements taken during Trial evaluation). Given this prediction, in some implementations, if the probability of exceeding the optimal value found thus far is sufficiently low, early stopping can be requested for the Trial.

While prior work on automated early stopping used Bayesian parametric regression (see, e.g., Domhan et al. 2015. Speeding Up Automatic Hyperparameter Optimization of Deep Neural Networks by Extrapolation of Learning Curves. In *IJCAI*. 3460-3468; and Swersky et al. 2014. Freeze-thaw Bayesian optimization. arXiv preprint arXiv: 1406.3896 (2014)), according to an aspect of the present disclosure, a Bayesian non-parametric regression can also be used, such as a Gaussian process model with a carefully designed kernel that measures similarity between performance curves. Such an algorithm can be robust to many kinds of performance curves, including those coming from applications other than tuning machine learning hyperparameters in which the performance curves may have very different semantics. Notably, this stopping rule can still work well even when the performance curve is not measuring the same quantity as the objective value, but is merely predictive of it.

3.2.1 Regression on Performance Curves

Gaussian Processes provide flexible non-parameteric regression, with priors specified via a kernel function k. Given input parameters in X and performance curves in $\mathcal{C}$ (which encode the objective value over time, and may formally be thought of as sets of (time, objective value) pairs), we take the label of a trial to be its final performance.

Let $\mathcal{U}=X \times \mathcal{C}$ be the domain of trials along with their performance curves. The existing data can be regressed upon for a partially completed trial with a suitable kernel function k: $\mathcal{U} \times \mathcal{U} \rightarrow \mathbb{R}$.

Swersky et al. take a parameteric approach, developing a kernel that is tailored to exponentially decaying performance (in their words "strongly supports exponentially decaying functions") (2014. Freeze-thaw Bayesian optimization. arXiv preprint arXiv: 1406.3896 (2014)). In contrast, the example performance curve stopping rule provided by the present disclosure takes a non-parameteric approach. This approach is based on observations that, in practice, performance curves are typically not exponentially decaying, and may be hard to parameterize with few parameters.

Specifically, given a distance metric on performance curves, $\delta\colon \mathcal{C}\times\mathcal{C}\to\mathbb{R}$, and an isotrophic kernel function $k(x,x')=\kappa(\|x-x'\|)$ where $\|\cdot\|$ is a norm, it can be augmented to handle the performance curves via $$k((x,c),(x',c'))=\kappa(\|x\times x'\|+\delta(c,c'))$$

Examples for $\kappa$ include the familiar Gaussian and Matérn kernel functions. A reasonable choice for $\delta$ may also smooth out the performance curves, and may include its own kernel hyperparameters such as a length-scale.

3.2.2 Deciding when to Stop Early

Given good estimates of the final objective value, together with confidence intervals enables the termination of unpromising trials, e.g., those whose probability of exceeding the best trial result yet found is below a set threshold.

This method also allows for automatic convergence detection: If the confidence interval of the final objective value both contains the more recent intermediate result (possibly after smoothing) and/or is smaller in width than a fixed threshold, then the trial can be declared as converged and terminated.

3.2.3 Regressing on Transformed Data

Clearly, the effectiveness of this early stopping rule depends on the quality of the predictions of the final objective value for an ongoing trial with intermediate results. Encoding good priors to ensure the right kinds of inductive bias is important.

To improve the regression in practice, start with an informal observation: When training models with different hyperparameter values, the performance curves are often similar in shape, but offset from one another.

More precisely, suppose (smoothed) performance curves $c_1, c_2, \ldots, c_n$ are given from models trained with different hyperparameter values, each of which is a function $c\colon [T]\to \mathbb{R}$, where $[n]:=\{1, 2, \ldots, n\}$ and $T\in\mathbb{N}$ is the maximum training time for any model. Also define $y_i:=c_i(T)$ to be the label of the $i^{th}$ data point.

Let $c\in\mathcal{C}$ be a performance curve. For convenience, the norm $\|c\|$ is defined to be the $\|\cdot\|$ norm of the vector $(c(1), c(2), \ldots, c(T))$. Let 1 be the constant function ($\forall t$, $1(t)=1$) and let $\|\cdot\|_2$ be the familiar Euclidean norm. Then, for most $i,j$ pairs, $\min_\alpha \|c_i-c_1-\alpha 1\|_2$ is small, and in particular that $c_i(T)-\alpha^*$ is an informative estimate for $c_j(T)$, where $\alpha^*$ is the argmin of the previous expression.

This observation can be exploited to improve predictive performance. As a toy example to illustrate one possible method of execution, suppose we have constants $\alpha_i$ sampled from $\mathcal{N}(0,1)$, and performance curves $c_i$ with $c_i(t)$ sampled from $c_i(t)\sim\alpha_i+\mathcal{N}(0,\sigma^2)$, with $\sigma^2\ll 1$. Given a test data point with partial performance curve $c^*$ that looks roughly constant with mean value $\alpha^*$, the task is to predict a final objective value of $\alpha^*$.

This prediction can be accomplished by regressing over transformed data $\{\varphi(c_i)\}_{i\geq 0}$, and then inverse-transforming the regressed value. As a concrete example, consider $$\varphi(c)=\operatorname{argmin}\{\|c'\|_2\colon c'=c-\alpha 1, \alpha\in\mathbb{R}\}$$

which is equivalent to $$\varphi(c) = c - 1\left(\frac{1}{T}\sum_{t=1}^{T} c(t)\right)$$

Let the adjustment of c relative to $\varphi$ be defined as $$\alpha(c):=\frac{1}{T}\sum_{t=1}^{T} c(t).$$

Then Gaussian Process regression can be performed on the adjusted data $\{(x_i, \varphi(c_i))\}_{i\geq 0}$, where recall the label is the last point in the (now adjusted) performance curve. That is, the $i^{th}$ label can be translated by $-\alpha(c_i)$. Given a posterior prediction of $y^*$ for an adjusted test point $(x^*, \varphi(c^*))$, then $y^*+\alpha(c^*)$ is ultimately predicted.

3.3 Example Transfer Learning

A valuable feature for black-box optimization tasks is to avoid doing repeated work. Often, users run a study that might be similar to studies they have run before. The parameter optimization system of the present disclosure can support a form of Transfer Learning which can allow users to leverage data from prior studies to guide and accelerate their current study. For instance, one might tune the learning rate and regularization of a machine learning system, then use that Study as a prior to tune the same ML system on a different data set.

One example approach to transfer learning provided by the present disclosure is relatively simple, yet robust to changes in objective across studies. In particular, the transfer learning approach provided by the present disclosure: scales well to situations where there are many prior studies; effectively accelerates studies (e.g., achieves better results with fewer trials) when the priors are good, particularly in cases where the location of the optimal, $x^*$, doesn't change much (e.g., doesn't change much between the prior Study and the current Study); and is robust against uninformative prior studies; and shares information even when there is no formally expressible relationship between the prior and current Studies.

In previous work on transfer learning in the context of hyperparameter optimization, Bardenet et al. discuss the difficulty in transferring knowledge across different datasets especially when the observed metrics and the sampling of the datasets are different (see Collaborative hyperparameter tuning. *ICML* 2 (2013), 199). They use a ranking approach for constructing a surrogate model for the response surface. This approach suffers from the computational overhead of running a ranking algorithm. Yogatama and Mann propose a more efficient approach, which scales as $\Theta(kn+n^3)$ for k studies of n trials each, where the cubic term comes from using a Gaussian process in their acquisition function (see Efficient Transfer Learning Method for Automatic Hyperparameter Tuning. *JMLR: W&CP* 33 (2014), 1077-1085).

One natural approach to implementing transfer learning might be to build a larger Gaussian Process regressor that is trained on both the prior(s) and the current Study. However that approach fails to satisfy the first design criteria; For k studies with n trials each it would require $\Omega(k^3 n^3)$ time. Such an approach also requires one to specify or learn kernel functions that bridge between the prior(s) and current Study, which may result in poorly chosen inductive biases and reducing its effectiveness.

Instead, one example approach provided by the present disclosure builds a stack of Gaussian Process regressors, where each regressor is associated with a study, and where each level is trained on the residuals relative to the regressor below it. There can be a linear ordering on all the studies that can put the current study at one extreme. The studies can be performed sequentially, in which case the ordering can be the temporal order in which the studies were performed.

Continuing with this example approach, the bottom of the stack can contain a regressor built using data from the oldest study in the stack. The regressor above it can be associated with the 2nd oldest study, and can regress on the residual labels of its data with respect to the predictions of the regressor below it. Similarly the regressor associated with the $i^{th}$ study can be built using the data from that study, and can regress on the residual labels with respect to the predictions of the regressor below it.

More formally, a sequence of studies $S_{i=1:k}$ on unknown objective functions $f_{i=1:k}$ are available, where the current study is $S_k$, and we build two sequences of regressors $R_{i=1:k}$ and $R'_{i=1:k}$ having posterior mean functions $\mu'_{i=1:k}$ and $\mu'_{i=1:k}$ respectively, and posterior standard deviation functions $\sigma_{i=1:k}$ and $\sigma'_{i=1:k}$, respectively. The final predictions will be $\mu_k$ and $\sigma_k$.

Let $D_i = (x_t^i, y_t^i)$ be the dataset for study $S_i$. Let $R'_i$ be a regressor trained using data $((x_t^i, y_t^i - \mu_{i-1}(x_t^i))$ which computes $\mu'_i$ and $\sigma'_i$. Let $\mu_1$ and $\sigma_1$ be derived from a regressor without a prior which is trained on $D_1$ directly, rather than the more complex form which subtracts $\mu$ from y. Then the posterior means at level i is defined as $\mu_i(x) := \mu'_i(x) + \mu_{i-1}(x)$. The posterior standard deviations at level i, $\sigma_i(x)$, is taken to be a weighted geometric mean of $\sigma'_i(x)$ and $\sigma_{i-1}(x)$, where the weights are a function of the amount of data (i.e., completed trials) in $S_i$ and $S_{i-1}$. The exact weighting function depends on a constant $\alpha \approx 1$ that sets the relative importance of old and new standard deviations.

Figure 5:
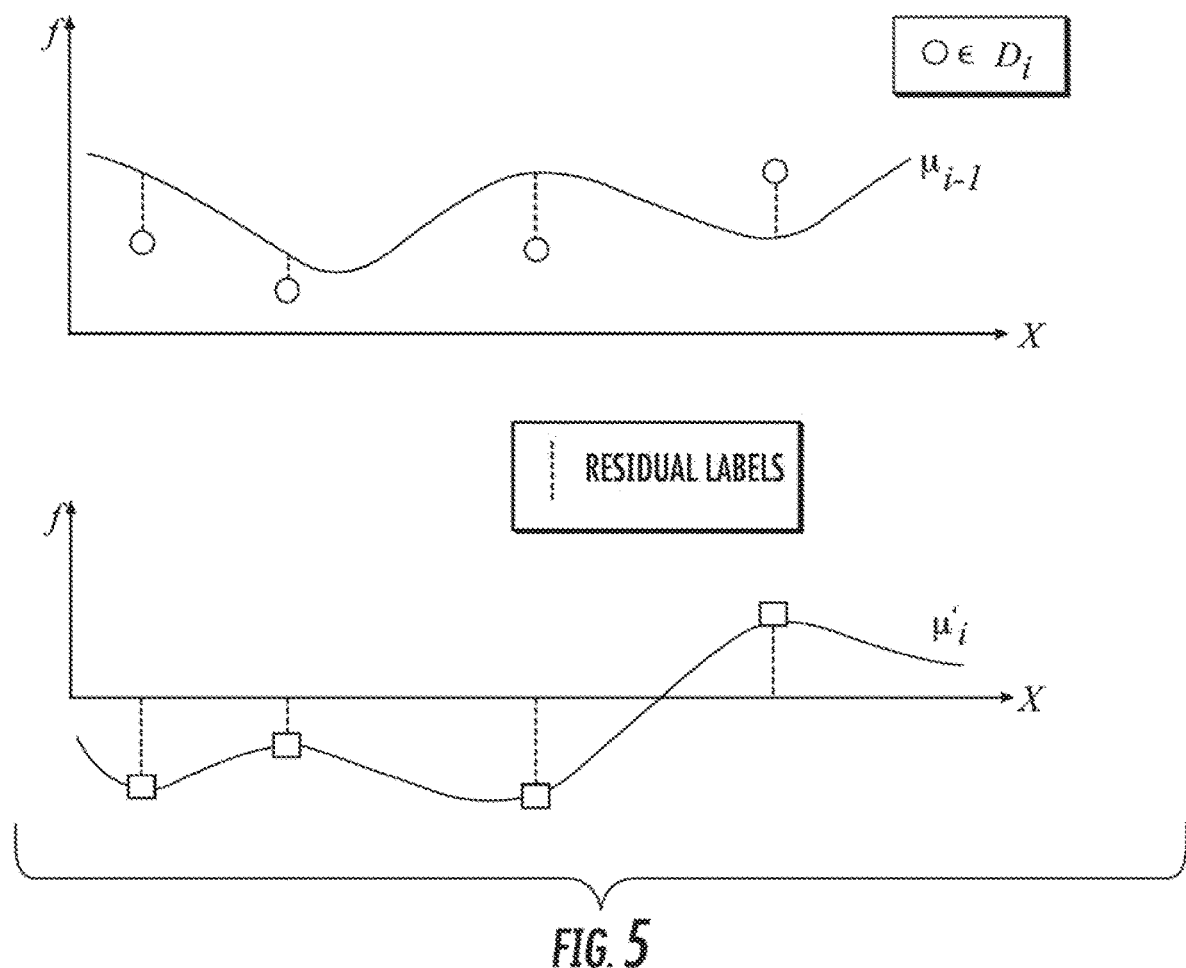
FIG. 5 depicts a graphical diagram of an example transfer learning scheme according to example embodiments of the present disclosure.

Details are provided in the pseudocode in Algorithm 1, and example regressors are illustrated in FIG. 5. In particular, FIG. 5 is an example illustration of the transfer learning scheme provided by the present disclosure, showing how $\mu'_i$ is built from the residual labels with respect to $\mu_{i-1}$ (shown in dotted lines).

---

Algorithm 1 Transfer Learning Regressor

```
 1:  # Returns a function R x_test , which returns (μ, σ)
 2:  function GetRegressor(D_training, i)
 3:    If i == 0: Return TrainGP(D_0)
 4:    # Recurse to get a Regressor (μ_{i-1}(x), σ_{i-1}(x)) trained on
 5:    # the data for all levels of the stack below this one.
 6:    R_prior ← GetRegressor(D_training, i − 1)
 7:    # Compute training residuals
 8:    D_residuals ← [(x, y − R_prior(x)[0])for(x, y) ∈ D_i]
 9:    # Train a Gaussian Process (μ'_i(x), σ'_i(x)) on the residuals.
10:    GP_residuals = TrainGP(D_residuals)
11:    function MyRegressor(x_test)
12:      μ_prior, σ_prior ← R_prior(x_test)
13:      μ_top, σ_top ← GP_residuals(x_test)
14:      μ ← μ_top + μ_prior
15:      β ← α|D_i|/(α|D_i| + |D_{i-1}|)
16:      σ ← σ_top^β σ_prior^{1-β}
17:      return μ, σ
18:    end function
19:    return MyRegressor
20:  end function
```

---

Algorithm 1 has the property that for a sufficiently dense sampling of the feasible region in the training data for the current study, the predictions converge to those of a regressor trained only on the current study data. This ensures a certain degree of robustness: badly chosen priors will not harm the prediction asymptotically. In Algorithm 1, the notation $R_{prior}(x)[0]$ indicates to compute the predicted mean with $R_{prior}$ at x, and report the mean.

In production settings, transfer learning is often particularly valuable when the number of trials per study is relatively small, but there may such studies. For example, certain production machine learning systems may be very expensive to train, limiting the number of trials that can be run for hyperparameter tuning, yet are mission critical for a business and are thus worked on year after year. Over time, the total number of trials spanning several small hyperparameter tuning runs can be quite informative. The example transfer learning scheme is particularly well-suited to this case; Also see section 4.3.

4. Example Results

4.1 Example Performance Evaluation

In order to evaluate the performance of the parameter optimization system of the present disclosure functions are required that can be used to benchmark the results. That is, pre-selected, easily calculated functions with known optimal points that have proven challenging for black-box optimizers. The success of an optimizer on some benchmark function $f$ can then be measured by its final optimality gap. That is, if x* is any argument minimizing $f()$, and $\hat{x}$ is the best solution found by the optimization algorithm, then the quality of the results can be measured by $|f(\hat{x}) - f(x^*)|$. If, as is frequently the case, the optimization method has a stochastic component, the average optimality gap can be calculated by averaging over multiple runs of the optimization function on the benchmark.

Comparing between benchmarks is a little more difficult given the variation in region size and difficulty. For example, a good black-box optimizer applied to the Rastrigin function (see, e.g., Finck et al. 2009. Real-Parameter Black-Box Optimization Benchmarking 2009: Presentation of the Noiseless Functions. http://coco.gforge.inria.fr/lib/exe/fetch.php?media=download3.6:bbobdocfunctions.pdf. (2009). [Online]) might come within 160 of optima with some effort, while a random selection of samplings for the Beale function can quickly get to a point within 60 of optimal. Hence normalization is necessary. One example normalizing factor is the performance of Random Search, quantifying how much each algorithm improves over random sampling. Once normalized, the results can be averaged over the benchmarks to get a single value representing average improvement over random sampling.

The benchmarks selected were primarily taken from the Black-Box Optimization Benchmarking Workshop (see Finck et al. 2009. Real-Parameter Black-Box Optimization Benchmarking 2009: Presentation of the Noiseless Functions. http://coco.gforge.inria.fr/lib/exe/fetch.php?media=download3.6:bbobdocfunctions.pdf. (2009). [Online]) (an academic competition for black-box optimization tools), and include, for example, the Beale, Branin, Elliposidal, Rastrigin, Rosenbrock, Six Hump Camel, Sphere, and Styblinski benchmark functions. Note that all functions are formulated as minimization problems.

4.2 Example Empirical Results

Figure 6:
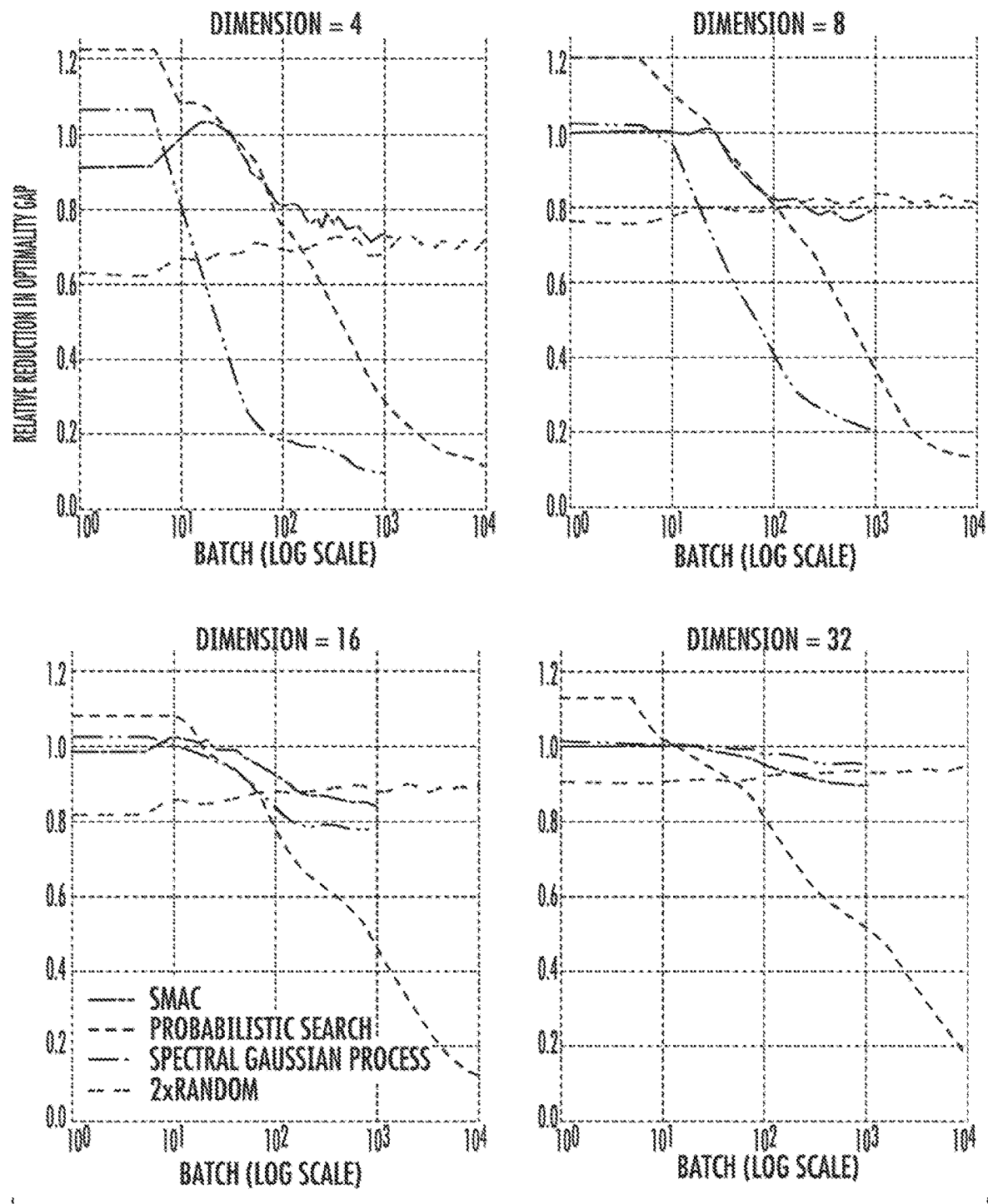
FIG. 6 depicts graphical diagrams of example experimental results according to example embodiments of the present disclosure.

In FIG. 6 result quality is compared for three example algorithms currently implemented in the framework: a spectral Gaussian process implementation (Quiñonero-Candela et al. 2010. Sparse spectrum Gaussian process regression. *Journal of Machine Learning Research* 11, June (2010), 1865-1881), the SMAC algorithm (Hutter et al. 2011. Sequential model-based optimization for general algorithm configuration. In *International Conference on Learning and Intelligent Optimization*. Springer, 507-523), and a probabilistic search method provided by the present disclosure.

In particular, FIG. 6 provides a ratio of the average optimality gap for each algorithm to that of the Random Search at a given number of samples. The 2×Random Search is a Random Search allowed to sample two points at every step (as opposed to a single point for the other algorithms).

For a given dimension d, each benchmark function is generalized into a d dimensional space, each benchmark is run 100 times, and the intermediate results are recorded (averaging these over the multiple runs). FIG. 6 shows the results for dimensions 4, 8, 16, and 32 in terms their improvement over Random Search. For each plot, the horizontal axis represents the point in the algorithm where that number of trials have been evaluated, while the vertical access indicates the algorithms optimality gap as a fraction of the Random Search optimality gap at the same point. The 2×Random Search curve is the Random Search algorithm when it was allowed to sample two points for every single point of the other samplers. While some authors have claimed that 2×Random Search is highly competitive with Bayesian Optimization methods (see, e.g., Li et al. 2016. Hyperband: A Novel Bandit-Based Approach to Hyperparameter Optimization. *CoRR* abs/1603.06560 (2016). http://arxiv.org/abs/1603.06560), the data provided herein suggests this is only true when the dimensionality of the problem is sufficiently high (e.g., over 16).

4.3 Example Transfer Learning Results

The convergence of transfer learning is tested in a 10 dimensional space using the 8 black-box functions described in section 4.1. Up to 180 trials are run and transfer learning is applied every 6 trials using the previous 6 as its prior, such that there are 30 linearly chained studies. Transfer learning is deemed to be converging if the optimality gap shrinks with increasing trials. It is critical to note convergence to the optimal is a difficult task since each study gets a budget of only 6 trials whilst operating in a 10 dimensional space.

Figure 7:
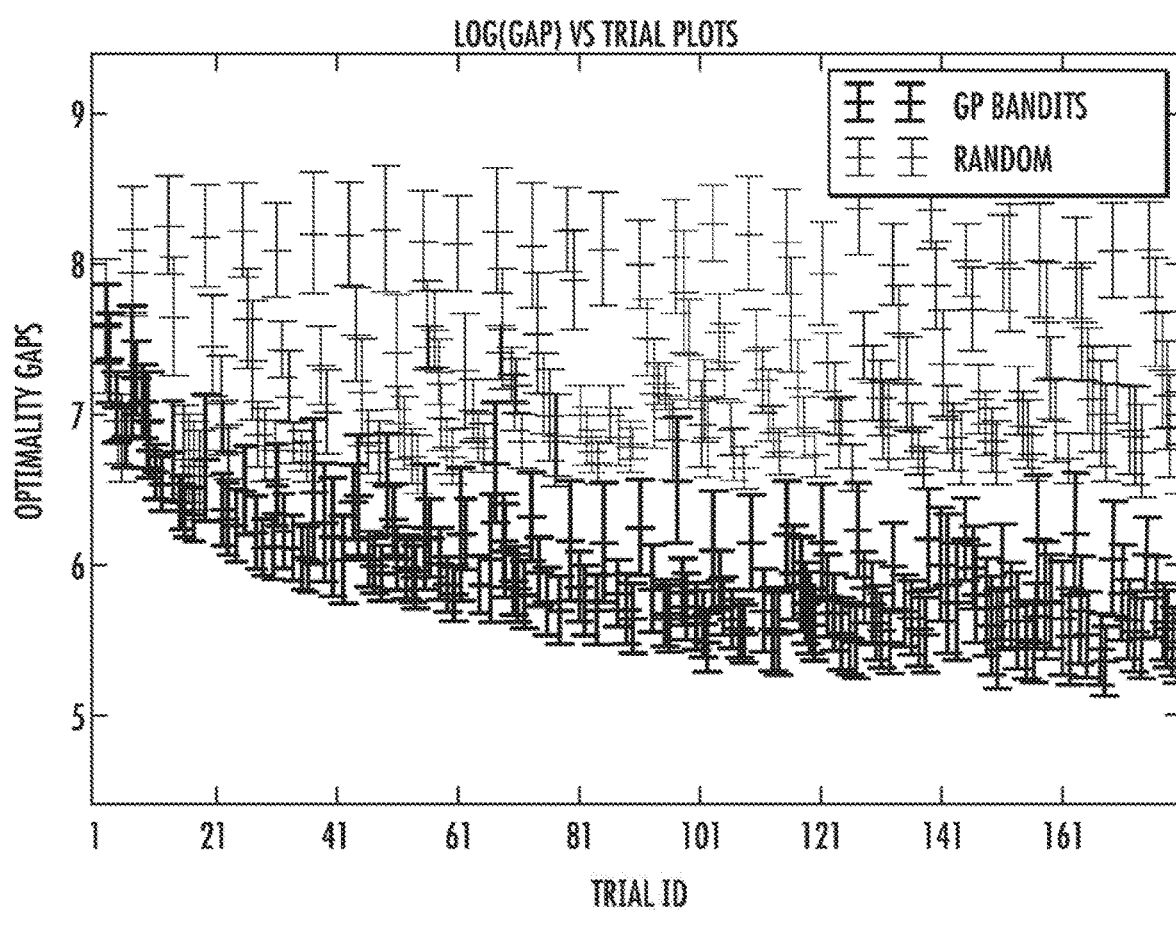
FIG. 7 depicts a graphical diagram of example experimental results according to example embodiments of the present disclosure.

FIG. 7 shows the convergence of two search algorithms, Gaussian Process Bandits and Random Search, by comparing the log of the geometric mean of the optimality gap across all the black box functions. Note that the GP Bandit shows steady progress towards the optimal when compared to Random Search thus demonstrating the effective transfer of knowledge from the earlier trials. Also, note the saw-tooth pattern as the X axis is traversed due to transfer learning being applied every 6 trials.

In particular, FIG. 7 illustrates the convergence of transfer learning in a 10 dimensional space using the 8 black-box functions described in section 4.1. Transfer learning is applied to every 6 trials using the previous 6 as its prior. The X axis shows increasing trials whereas the Y axis shows the log of the geometric mean of optimality gaps across all the benchmarks. Note that GP bandits shows consistent decline in optimality gap with increasing trials thus demonstrating effective transfer of knowledge from the earlier trials.

4.4 Example Automated Stopping Results

4.4.1 Example Performance Curve Stopping Rule Results

Through experimentation, the use of the performance curve stopping rule has been shown to achieve optimality gaps comparable to those achieved without the stopping rule, while using approximately 50% fewer CPU-hours when tuning hyperparameter for deep neural networks. This result is in line with figures reported by other researchers, while using a more flexible non-parametric model. For example, Domhan et al. report reductions in the 40% to 60% range on three ML hyperparameter tuning benchmarks (2015. Speeding Up Automatic Hyperparameter Optimization of Deep Neural Networks by Extrapolation of Learning Curves. In *IJCAL* 3460-3468).

5. Example Use Cases

The parameter optimization system of the present disclosure can be used for a number of different application domains.

5.1 Example Hyperparameter Tuning Use Case

The parameter optimization system of the present disclosure can be used to optimize hyperparameters of machine learning models, both for research and production models. One implementation scales to service the entire hyperparameter tuning workload across Alphabet, which is extensive. As one (admittedly extreme) example, the parameter optimization system of the present disclosure has proven capable of performing hyperparameter tuning studies that collectively contain millions of trials. In one example context, a single trial can involve training a distinct machine learning model using different hyperparameter values. This would not be possible without effective black-box optimization. For other research projects, automating the arduous and tedious task of hyperparameter tuning accelerates their progress.

Perhaps even more importantly, the parameter optimization system of the present disclosure has made notable improvements to production models underlying many Google products, resulting in measurably better user experiences for over a billion people.

5.2 Example Automated A/B Testing Use Case

In addition to tuning hyperparameters, the parameter optimization system of the present disclosure can have a number of other uses. It can be used for automated A/B testing of web properties, for example tuning user-interface parameters such as font and thumbnail sizes, color schema, and spacing, or traffic-serving parameters such as the relative importance of various signals in determining which items to show to a user. An example of the latter would be "how should the search results returned from Google Maps trade off search-relevance for distance from the user?"

5.3 Example Physical Design or Logistical Problems Use Case

The parameter optimization system of the present disclosure can also be used to solve complex black-box optimization problems arising from physical design or logistical problems. More particularly, the parameter optimization system can be employed to optimize the adjustable parameters (e.g., component or ingredient type or amount, production order, production timing) of a physical product or process of producing a physical product such as, for example, an alloy, a metamaterial, a concrete mix, a process for pouring concrete, a drug cocktail, or a process for performing therapeutic treatment. Additional example applications include optimization of physical systems (e.g., optimizing airfoils in simulation) or logistical problems.

More generally, the parameter optimization system and associated techniques provided herein can be applied to a wide variety of products, including any system, product, or process that can be specified by, for example, a set of components and/or operating/processing parameters. Thus, in some implementations, the parameter optimization system can be used to perform optimization of products (e.g., personalized products) via automated experimental design.

5.4 Example Additional Capabilities

Additional capabilities of the system can include:

Infeasible trials: In real applications, some trials may be infeasible, meaning they cannot be evaluated for reasons that are intrinsic to the parameter settings. Very high learning rates may cause training to diverge, leading to garbage models.

Manual overrides of suggested trials: Sometimes the suggested trial cannot be evaluated or else a different trial might mistakenly be evaluated rather than the one asked for. For example, workflow, component availability, or other reasons can cause the evaluation of a particular suggested trial to be impractical.

The parameter optimization system of the present disclosure can support marking trials as infeasible, in which case they do not receive an objective value. In the case of Bayesian Optimization, previous work can, for example, assign them a particularly bad objective value, attempt to incorporate a probability of infeasibility into the acquisition function to penalize points that are likely to be infeasible (see, e.g., Bernardo et al. 2011. Optimization under unknown constraints. *Bayesian Statistics* 9 9 (2011), 229), or try to explicitly model the shape of the infeasible region (see, e.g., Gardner et al. 2014. Bayesian Optimization with Inequality Constraints. In *ICML*. 937-945; and Gelbart et al. 2014. Bayesian optimization with unknown constraints. *In Proceedings of the Thirtieth Conference on Uncertainty in Artificial Intelligence*. AUAI Press, 250-259).

One example implementation of the present disclosure takes the first approach, which is simple and fairly effective for the applications considered. Regarding manual overrides, the parameter optimization system of the present disclosure can include a stateless design that enables it to support updating or deleting trials; for instance, the trial state can simply be updated on the database.

6. Introduction to Gradientless Descent

The present disclosure also provides a novel algorithm for black-box function optimization based on random sampling, which is referred to in some instances as "Gradientless Descent." The Gradientless Descent algorithm converges exponentially fast under relatively weak conditions and mimics the exponentially fast convergence of gradient descent on strongly convex functions. It has been demonstrated that the algorithm is highly effective in practice, as will be shown with example experimental results below.

It has also been demonstrated that the algorithm performs very well empirically, even on high-dimensional problems. The algorithm is sufficiently fast (constant time per suggested point $x_t$) that it is suitable for applications in which function evaluations are only moderately expensive.

The present disclosure assumes oracle access to (or at least the ability to evaluate within a reasonable margin of error) an objective function $f: \mathcal{X} \to \mathbb{R}$ to be optimized, and beyond that, as few assumptions are made as possible. Without loss of generality, minimization is considered by the discussion provided herein, wherein the goal is to find $x \in \arg\min\{f(x): x \in \mathcal{X}\}$. However, maximization goals can easily be accomplished with minor changes to the algorithm.

Often, evaluation of $f$ is expensive in one sense or another; so one primary cost metric considered herein is the number of function evaluations.

6.1 Example Related Algorithms

Given the wide applicability of black-box optimization, it is not surprising that it has been extensively studied in many fields. The simplest algorithms include random search and grid search, which select points uniformly at random or from a regular grid, respectively. Simulated annealing has been used for black-box optimization for decades in a variety of fields (see, e.g., Kirkpatrick et al. Optimization by simulated annealing. *Science*, 220 (New Series) (4598):0 671-680, 1983; and Brooks and Morgan. Optimization using simulated annealing. *Journal of the Royal Statistical Society. Series D (The Statistician)*, 44(2):241-257, 1995), as have genetic algorithms (see e.g., Rios and Sahinidis. Derivative-free optimization: a review of algorithms and comparison of software implementations. *Journal of Global Optimization*, 560 (3):0 1247-1293, 2013 and references therein).

Another class of algorithms maintains a local set of points and updates it iteratively. For example, the Nelder-Mead (Nelder and Mead. A simplex method for function minimization. *The computer journal*, 70 (4):0 308-313, 1965.) algorithm maintains a simplex that it updates based on a few simple rules. More modern approaches develop local models, maintaining a trust region where the model is presumed to be accurate, and optimizing the local model within the trust region to select the next point. See Rios and Sahinidis. Derivative-free optimization: a review of algorithms and comparison of software implementations. *Journal of Global Optimization*, 560 (3):0 1247-1293, 2013. and references therein; and Conn et al. *Introduction to derivative free optimization*. SIAM, 2009. for broad treatments.

More recently introduced, Bayesian optimization (BO) algorithms (e.g., Shahriari et al. Taking the human out of the loop: A review of Bayesian optimization. *Proceedings of the IEEE*, 1040 (1):0 148-175, 2016) attempt to model the objective function over the entire feasible space and make an explicit tradeoff between exploration and exploitation explicit (i.e., treating optimization as an infinite-armed bandit problem). Most researchers model the objective using either Gaussian processes (see, e.g., Srinivas et al. Gaussian process optimization in the bandit setting: No regret and experimental design. *ICML*, 2010; and Snoek et al. Practical Bayesian optimization of machine learning algorithms. In *Advances in neural information processing systems*, pp. 2951-2959, 2012), deep neural networks (see, e.g., Snoek et al. Scalable Bayesian optimization using deep neural networks. In *Proceedings of the 32nd International Conference on Machine Learning*, pp. 2171-2180, 2015; and Wilson et al. Deep kernel learning. In *Proceedings of the 19th International Conference on Artificial Intelligence and Statistics*, pp. 370-378, 2016), or regression trees (see, e.g., Hutter et al. Sequential model-based optimization for general algorithm configuration. In *International Conference on Learning and Intelligent Optimization*, pp. 507-523. Springer, 2011; and Bergstra et al. Algorithms for hyper-parameter optimization. In *Advances in Neural Information Processing Systems*, pp. 2546-2554, 2011).

All these methods have tradeoffs in terms of speed of convergence, robustness, and scaling to large studies. Despite advances in algorithms for black-box optimization, random search remains popular among practitioners. This is speculated to be because it is easy to understand and implement, is dirt-cheap computationally, and has predictable and dependable (though mediocre) performance. Random search is also immune to pathological objective functions or noise because it is oblivious (i.e., it does not adapt based on the values $f(x_t)$ of the points $\{x_t\}_{t=1}$ it chooses). Of course, this very obliviousness means it cannot exploit any properties of $f$ to converge faster.

Thus, there is a need for an advanced black-box optimization algorithm that is more clever and faster than random search yet retains most of random search's favorable qualities. The present disclosure provides an algorithm for black-box optimization called Gradientless Descent that is fast and easy to implement, performs well in practice, and has interesting convergence guarantees for a wide class of objective functions.

The black-box optimization algorithm of the present disclosure is evaluated empirically against a state of the art implementation of Bayesian Optimization with Gaussian process modeling and demonstrated to outperform the latter when the budget on evaluations is sufficiently large. It is then proven that convergence bounds on the algorithm are analogous to strong bounds for gradient descent.

7. Example Gradientless Descent Algorithm

An example Gradientless Descent algorithm (Algorithm 2) is provided below. Algorithm 2 is one example algorithm to accomplish certain aspects described herein can be modified in various ways to produce variants that are within the scope of the present disclosure.

Algorithm 2 uses the following notation: let d denote the dimensionality of the problem, let s~$\mathcal{U}$(S) denote that s is sampled uniformly at random from S, and let diam($\mathcal{X}$) denote the diameter of $\mathcal{X}$, i.e., diam($\mathcal{X}$):=max{∥x−x'∥:x, x'∈$\mathcal{X}$}.

Algorithm 2 is an iterative algorithm. In some implementations, when generating a new point in round t, it can sample uniformly at random with probability ε, or it can sample from a ball $B_t$ of radius $r_t$ around the best point seen so far, $b_{t-1}$. The radius, $r_t$, can be a random sample from a geometric series; as can be seen in Section 9, which can allow the algorithm to converge rapidly towards a good point.

When ε>0, the algorithm can spend at least part of its time investigating uniformly randomly sampled points. This can be used to handle multiple minima, and can guarantee that the algorithm's worst-case performance cannot be much worse than Random Search.

---

Algorithm 2 Gradientless Descent

1: input: Closed convex feasible set $\mathcal{X} \subset \mathbb{R}^d$, objective function $f$ to minimize, uniform-sampling weight ε ∈ [0,1], resolution δ > 0, number of points T ∈ $\mathbb{Z}_+$ to evaluate.
2: Initialize t = 1.
3: Select $x_1 \sim \mathcal{U}(\mathcal{X})$ and receive feedback $y_1 := f(x_1)$.
4: Set $b_1 = x_1$.
5: for t = 2, ..., T do
6:   Sample p ~ $\mathcal{U}$([0,1]).
7:   if p ≤ ε then
8:     Select $x_t \sim \mathcal{U}$
9:   else
10:    Let $R := \left\{\delta \cdot 2^k : 0 \leq k \leq \log_2\left(\frac{\text{diam}(\mathcal{X})}{\delta\sqrt{d}}\right)\right\}$.
11:    Sample $r_t \sim \mathcal{U}(R)$
12:    Let $B_t := \{x: \|x - b_{t-1}\| \leq r_t\}$.
13:    Sample $\hat{x} \sim \mathcal{U}(B_t)$.
14:    Select as $x_t$ the projection of $\hat{x}$ onto $\mathcal{X}$.
15:  end if
16:  Receive feedback $y_t := f(x_t)$.
17:  Set $b_t = \arg\min\{f(x): x \in \{b_{t-1}, x_t\}\}$
18: end for

---

8. Example Empirical Evaluation

8.1 Example Methodology

The quality of each algorithm can be assessed based on its optimality gap, the distance of its best-found score from the known optimal score, on selected benchmark functions, such as benchmark functions selected from the 2009 Black-Box Optimization Benchmarking workshop of the Genetic and Evolutionary Computation Conference (GECCO) (Hansen et al. Real-Parameter Black-Box Optimization Benchmarking 2009: Noiseless Functions Definitions. Research Report RR-6829, INRIA, 2009. URL https://hal.inria.fr/inria-00362633). For example, the Beale, Branin, Ellipsoidal, Rastrigin, Rosenbrock, Six Hump Camel, Sphere, and Styblinski benchmark functions or other functions with known optimal solutions designed to test the ability of black-box optimization routines can be used. The quality metric of a given run on a single benchmark is the ratio of the resulting optimality gap to that produced by a Random Search run for the same duration (thus normalizing the values, allowing for comparison to benchmarks of differing sized spaces). This value is averaged over 100 applications (to account for the stochastic nature of most algorithms), and the mean of this normalized value over all benchmarks is taken resulting in the relative optimality gap of the algorithm applied to the benchmark.

8.2 Example Results

Figure 8:
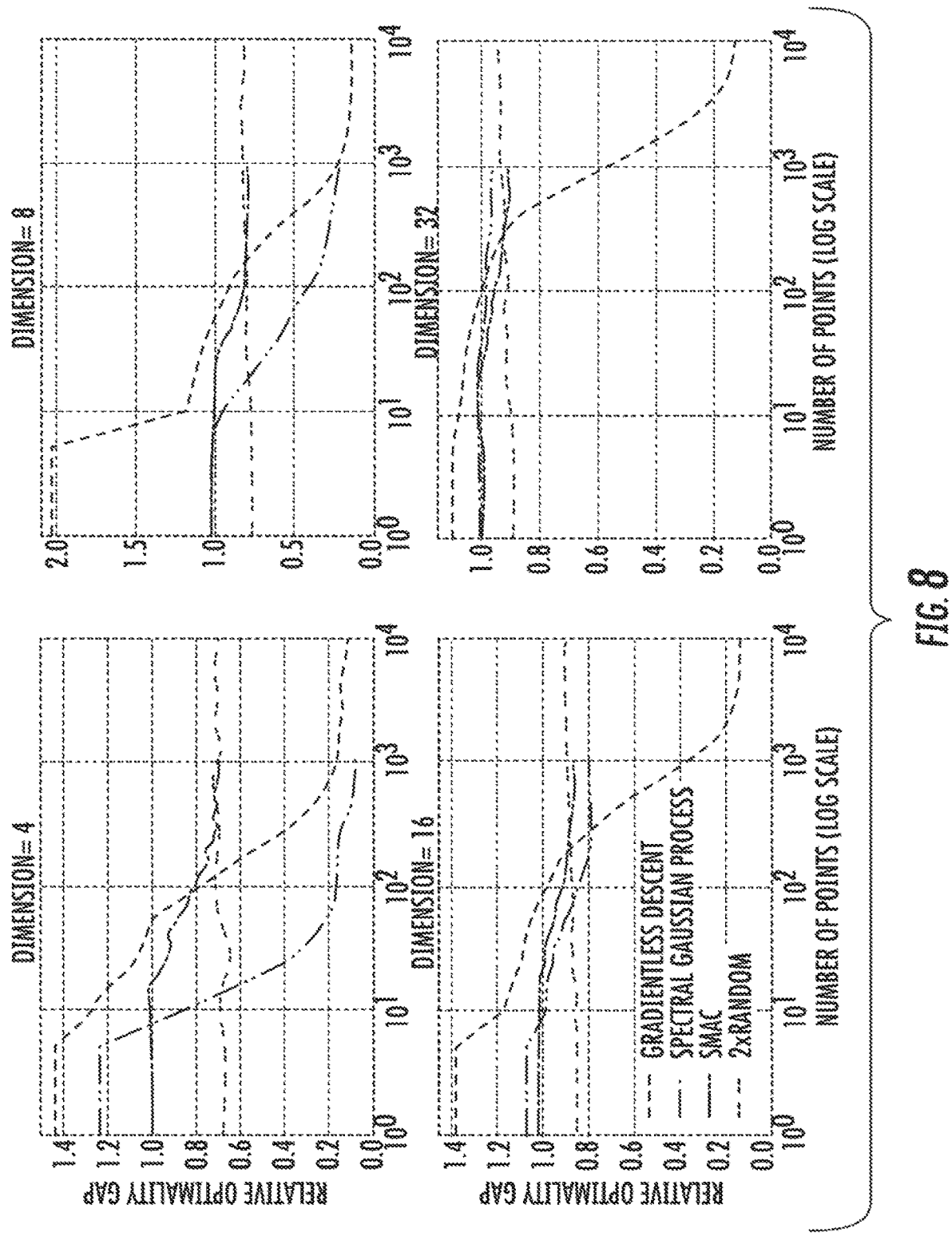
FIG. 8 depicts graphical diagrams of example experimental results according to example embodiments of the present disclosure.

FIG. 8 shows the average optimality gap of each algorithm relative to Random Search, in problem space dimensions of 4, 8, 16, and 32. The horizontal axis shows the progress of the search in terms of the number of function evaluations, while the vertical axis is the mean relative optimality gap. For this study three algorithms were compared: SMAC (Hutter et al. Sequential model-based optimization for general algorithm configuration. In *International Conference on Learning and Intelligent Optimization*, pp. 507-523. Springer, 2011), an implementation of Gaussian Process Bandits with a Spectral Kernel (Quiñonero-Candela et al. Sparse spectrum gaussian process regression. *Journal of Machine Learning Research*, 110 (June):0 1865-1881, 2010), and Gradientless Descent as described in this paper.

FIG. 8 shows all three algorithms are clearly superior to Random Search after the burn-in period (which is quite small—note the logarithmic—scaling). Further, while Gradientless Descent lags behind the Bayesian Optimization (BO) approach at first, it eventually dominates: the higher the dimensionality of the problem, the earlier the break-event point appears to be.

What is not shown in FIG. 8 is that the BO methods can be considerably more time consuming than Gradientless Descent. While the computational speed of BO may not be critical when evaluating $f$ is extremely expensive, in more moderate cases (especially when the number of points is large) the Bayesian Optimization itself may become as expensive as evaluating the objective function. By comparison, Gradientless Descent is essentially free—requiring only $O(1)$ time per suggested point.

Finally, the 2×Random Search (a version of Random Search that is allowed to sample two points for every one of a normal point) is also plotted. While Li et al. have claimed 2×Random Search is highly competitive (see, Hyperband: A novel bandit-based approach to hyperparameter optimization. *CoRR*, abs/1603.06560, 2016. URL http://arxiv.org/abs/1603.06560), the data suggests this is only true at high dimensions, and moreover Gradientless Descent consistently dominates 2×Random Search after a burn-in period.

9. Example Analysis of Convergence

In this section convergence results under some relatively weak assumptions on the problem domain are provided.

9.1 Preliminaries

A function $f$ is called L-Lipschitz if it is Lipschitz continuous with Lipschitz constant L. The level-sets of $f$ are the preimages of the objective function. Formally, $\mathcal{L}_x := \{x': f(x') = f(x)\}$.

The optimality gap of a point x is $\gamma(x) := f(x) - f(x^*)$, where $x^*$ is any feasible point minimizing $f$. The optimality gap of a set of points is the minimum optimality gap of its elements.

Definition 1: (β-balanced) Fix $\mathcal{X}$, $\mathcal{X}' \subset \mathcal{X}$ and $x^* \in \mathcal{X}'$. Let $\rho(x,u) := \{x+tu : t \in \mathbb{R}_{\geq 0}\}$ for vector $u \in \mathbb{R}^d$. A function $f: \mathcal{X} \to \mathbb{R}$ is called β-balanced with respect to $x^* \in \mathcal{X}'$ if for all level sets $\mathcal{L}_1 = f^{-1}(y_1)$ and $\mathcal{L}_2 = f^{-1}(y_2)$ with $y_1 > y_2$ and all directions $u \in \mathbb{R}^d$, $\|u\|=1$, then, $$\min_u \left\{ \frac{\|x_1 - x_2\|}{\|x_1 - x^*\|} : x_i \in \rho(x^*, u) \cap \mathcal{L}_i \cap \mathcal{X}' \right\} \geq \quad (1)$$
$$\beta \max_{u'} \left\{ \frac{\|x'_1 - x'_2\|}{\|x'_1 - x^*\|} : x'_i \in \rho(x^*, u') \cap \mathcal{L}_i \cap \mathcal{X}' \right\}$$

Figure 9:
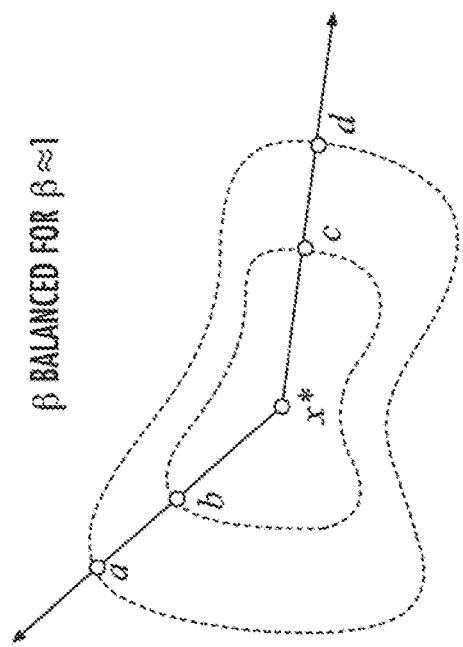
FIG. 9 depicts an example illustration of $\beta$-balancedness for two functions according to example embodiments of the present disclosure.

As an example, FIG. 9 provides an illustration of β-balancedness for two functions with level-sets shown. For β-balanced functions $\|d-c\|/\|d-x^*\| \geq \beta \|a-b\|/\|a-x^*\|$ for two level sets and rays originating at $x^*$.

Example 1: Spherical Level Sets

The function $f(x) = \|x\|^p$ for any $p > 0$ has spherical level sets, and is 1-balanced with respect to the optimal $x^* = 0$ in $\mathcal{X}' = \{x : f(x) \leq r^p\}$ for any $r \in$.

Example 2: Ellipsoidal Level Sets

Likewise, $f(x) = \|Ax\|^p$ for a positive definite matrix A and $p > 0$ has ellipsoidal level sets and is 1-balanced with respect to the optimal $x^* = 0$ in $\mathcal{X}' = \{x : f(x) \leq r^p\}$.

Example 3: Spherical Level Sets with Constant Velocity

Fix $u \in \mathbb{R}^d$ with $\|u\|=1$, and any constant $\alpha \in [0,1)$. A function $f$ with optimum $x^* = 0$ that has level sets $f^{-1}(r) := \{x : f(x) = r\}$ which are spheres of radius r centered at $\alpha r u$ is 1-balanced with respect to $x^*$ in $f^{-1}(r)$ for all $r > 0$.

Given a smooth closed surface S and a point on that surface p, a ball B is considered tangent to S at p if B's surface contains p and B's tangent at p equals that of S. If B is contained in S, it is considered enclosed. Note the largest enclosed tangent sphere at p is in many (but not all) cases equal to the osculating sphere from differential geometry.

Condition 2: Suppose there exists a closed connected $\mathcal{X}' \subset \mathcal{X}$ with $\text{vol}(\mathcal{X}') \geq \mu \cdot \text{vol}(\mathcal{X})$ for $\mu > 0$ such that:

1. The optimal point $x^* = \arg\min\{f(x) : x \in \mathcal{X}\}$ lies within $\mathcal{X}'$.
2. $f$ is β-balanced with respect to $x^* \in \mathcal{X}'$ for some $\beta > 0$.
3. Every point in $\mathcal{X}'$ is superior to every point outside of it with respect to $f$. That is, $f(x') > f(x)$ for all $x' \in \mathcal{X}'$, $x \in \mathcal{X} \setminus \mathcal{X}'$.
4. There exists $\theta > 0$ such that for every $x \in \mathcal{X}'$, the level-sets $\mathcal{L}_x$ admit enclosed tangent balls of radius at least $\theta \|x-x^*\|$ that lie entirely within $\mathcal{X}$.

The first three sub-conditions on $\mathcal{X}'$ serve to avoid problems with optimal points lying on boundaries or corners of the feasible region.

The final sub-condition, requiring $\theta > 0$ ensures that it shall not be too hard to find directions that improve $f$, which is particularly important in high-dimension. Loosely speaking, $\theta > 0$ implies that the level set must not have corners.

An example of a function that does not satisfy this condition is the $\ell_\infty$ norm of x, i.e., $f(x) := \|x\|_\infty = \max\{x_i\}$. If $x_i = 1$ for all i, then only when all coordinates are reduced does the objective decrease, hence a random direction has only a $2^{-d}$ probability of decreasing the objective from x.

9.2 Example Convergence with a Single Basin of Attraction

A convergence result for Gradientless Descent under some simplifying assumptions is initially provided, and then generalized. In particular, treatment of multiple local minima is temporarily deferred.

Recall a sublevel set is the set of points with $f(x) \leq y$ for some y. In particular, it is assumed that the feasible region $\mathcal{X}$ for the objective $f$ is itself a sublevel set containing is a single basin of attraction—meaning its sublevel sets are connected.

For simplicity, is assumed that uniform sampling is given zero weight, i.e., $\varepsilon = 0$, and that the equations are within a single basin of attraction. Multiple local optima will be addressed later in this section.

Theorem 3: Let $f$ be a smooth L-Lipschitz objective function satisfying Condition 2 on feasible region $\mathcal{X} \subset \mathbb{R}^d$ with a single basin of attraction in $\mathcal{X}$, and moreover suppose $\mathcal{X}$ is a sublevel set of $f$. Let $\{x_t\}_{t\geq 1}$ be the points selected by Gradientless Descent with $\varepsilon=0$. Then there exists an absolute constant $\rho>0$ such that for all $\eta>0$, the optimality gap $\gamma_T$ after T steps satisfies:

$$Pr\left[\gamma_T \geq L \max\left(\frac{5\delta\sqrt{d}}{2\theta}, diam(\chi)\exp(-\Lambda)\right)\right] \leq \eta$$

where $$\Lambda := \frac{(T-1)\rho\beta\theta}{5d \cdot \log_2\left(\frac{diam(\chi)}{\delta\sqrt{d}}\right)} - \sqrt{2(T-1)\frac{\beta\theta}{5d}\ln(2/\eta)}.$$

In other words, the optimality gap shrinks at least exponentially fast, with an exponent of:

$$\frac{\beta\theta T}{5d \cdot \log_2\left(\frac{diam(\chi)}{\delta\sqrt{d}}\right)},$$

until it gets within distance $$\frac{5\delta\sqrt{d}}{2\theta}$$

of the optimum (where δ is a user-chosen parameter that may be arbitrarily small).

Note while ρ is hard to calculate, it is not impractically small; In Lemma 6 it is argued that it converges to a value above 0.158 in the limit of infinite dimensions.

Proof. Define the following potential function:

$$\phi(x):=\ln(\max\{\|x'-x^*\|:x'\in\mathcal{L}_x\}).$$

Since $f$ is L-Lipschitz continuous by assumption, then $\gamma(x)\leq L\|x-x^*\|\leq L\exp(\Phi(x))$, so bounds on $\Phi$ translate to bounds on the optimality gap. By assumption, $\varepsilon=0$, so $x_1$ is chosen uniformly at random, and all subsequent points $x_t$ are selected via sampling from a ball around $b_{t-1}$ in step t (this is referred to herein as ball-sampling).

Define $\Phi_t:=\Phi(b_t)$, and consider the random variable $\Delta_t:=\Phi_t-\Phi_{t-1}$. Because of the arg min in Algorithm 2 and because the level sets of $f$ are nested, it's trivially true that $\Phi$ is nonincreasing (i.e., $\Delta_t\leq 0$). However to show actual progress, high-probability upper bounds on $\Sigma_t \Delta_t$ are developed, ideally of the form $\Sigma_{t=2}^T \Delta_t\leq -c(T-1)$ for some constant c.

Figure 10:
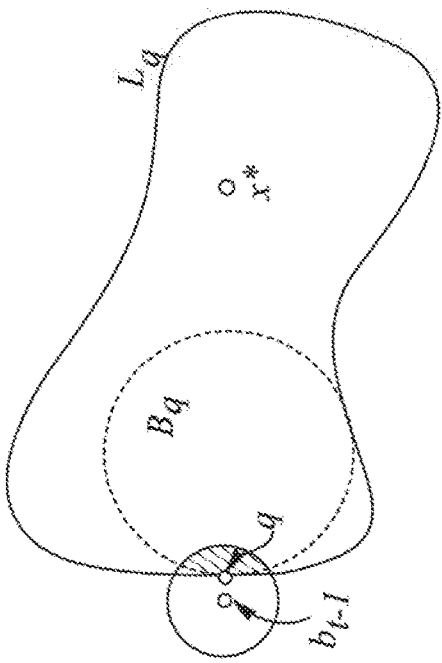
FIG. 10 depicts an example illustration of a ball sampling analysis according to example embodiments of the present disclosure.

FIG. 10 shows an event $\varepsilon_t$ that corresponds to "significant" progress in reducing $\Phi_t$; $\varepsilon_t$ is defined as follows. Let $b_{t-1}$ be the best point seen so far, and let $x^*$ be the optimum. Let $q=(1-v)b_{t-1}+vx^*$ for some $v\in(0,1)$ to be determined, and let $B_q$ be an enclosed tangent ball to $\mathcal{L}_q$ at q, of radius $\theta\|q-x^*\|=\theta(1-v)\|b_{t-1}-x^*\|$ as guaranteed by Condition 2. Then $\varepsilon_t$ is the event that our sample $x_t \in B_q$. Thus, with reference to FIG. 10, significant progress event, $\varepsilon_t$, means sampling a point in the shaded region.

Let $c_q$ be the center of $B_q$, and let $l=\|b_{t-1}-c_q\|$. Suppose the sampling ball radius $r_t$ lies in $[\ell/2\sqrt{d}, 1/\sqrt{d}]$. This event is denoted by $\mathcal{R}_t$; $Pr[\varepsilon_t|\mathcal{R}_t]$ is now bound using Lemma 6. If the radius $r_q$ of $B_q$ satisfies $$r_q \geq \left(1 - \frac{1}{4d}\right)\ell,$$

then scaling all distances by 1/l and applying Lemma 6 establishes that the fraction of the sampling ball's volume that lies in $B_q$ is $\Omega(1)$, i.e., $vol(B_t \cap B_q)=\Omega(vol(B_t))$.

It is now shown that $v=\theta/5d$ is sufficient to ensure $r_q$ is large enough. Define $dist(x,S):=\min\{dist(x,s):s\in S\}$. Note $$r_q \geq \left(1 - \frac{1}{4d}\right)\ell$$

ifdist $$(b_{t-1}, B_q) \leq \frac{\ell}{4d},$$

since $l=dist(b_{t-1},B_q)+r_q$. Next note $dist(b_{t-1},B_q)\leq\|b_{t-1}-q\|=v\|b_{t-1}-x^*\|$. Hence it is sufficient to prove $$v\|b_{t-1} - x^*\| \leq \frac{\ell}{4d} \qquad (2)$$

However, $$l\geq\theta\|q-x^*\|=\theta(1-v)\|b_{t-1}-x^*\| \qquad (3)$$

Therefore close-enough holds when $$v \leq \frac{\theta(1-v)}{4d},$$

which one can easily confirm for $v=\theta/5d$ after noting that $\theta\in[0,1]$ and $d\geq 1$. Hence $Pr[\varepsilon_t|\mathcal{R}_t]=\Omega(1)$ when $v=\theta/5d$.

Figure 11:
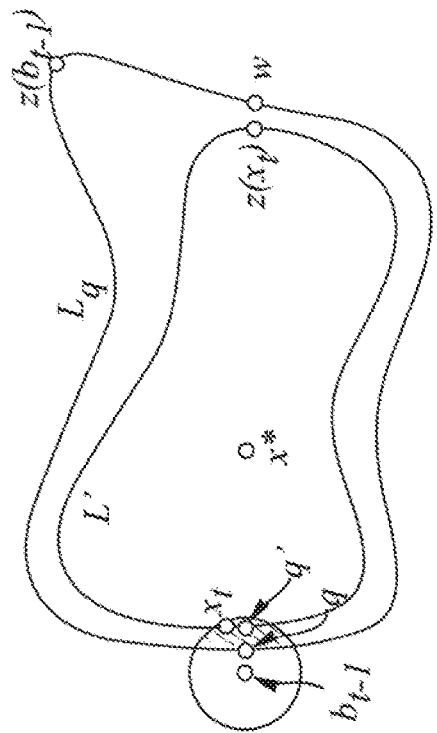
FIG. 11 depicts an example illustration of a ball sampling analysis according to example embodiments of the present disclosure.

Next it can be proven that $\varepsilon_t$ implies a significant decrease in $\Phi$, i.e., that $|\Delta_t|$ is large. Consider that if $\varepsilon_t$ occurs, then $x_t$ must lie in a levelset $\mathcal{L}'$ at least as good as $\mathcal{L}_q$, and $\mathcal{L}'$ must contain a point q' in the convex hull of $\{b_{t-1}, x^*\}$ at least distance $$v\|b_{t-1} - x^*\| = \frac{\theta}{5d}\|b_{t-1} - x^*\|$$

from $b_{t-1}$. Refer to FIG. 11 for an illustration. In particular, FIG. 11 provides an illustration of the ball sampling analysis. When going from $b_{t-1}$ to $x_t$, the potential $\Phi$ drops from $\log\|z(b_{t-1})-x^*\|$ to $\log\|z(x_t)-x^*\|$.

Here there is a direction u such that with respect to that direction, $\mathcal{L}'$ is at least a $$1 - \frac{\theta}{5d}$$

fraction closer to x* than is $b_{t-1}$. Hence by Condition 2 and the definition of β-balancedness, in every direction u moving from $\rho(x^*, u) \cap \mathcal{L}_{b-1}$ to $\rho(x^*, u) \cap \mathcal{L}'$ results in being at least a $$1 - \frac{\beta\theta}{5d}$$

fraction closer to x*.

Next, it is shown that this implies that $t \mapsto \exp(\Phi_t)$ shrinks by at least a $$1 - \frac{\beta\theta}{5d}$$

fraction. Suppose $z(x) \in \arg\max\{\|x'-x^*\|:x' \in \mathcal{L}_x\}$, and consider the direction u proportional to $z(x_t)-x^*$. Because of the β-balancedness of $f$, the point $w \in \rho(x,u) \cap \mathcal{L}_{b-1}$ cannot be too close to $z(x_t)$. In particular:

$$1 - \|z(x_t) - x^*\|/\|w - x^*\| \geq \frac{\beta\theta}{5d} \quad (4)$$

Clearly, $\|z(b_{t-1})-x^*\| \geq \|w-x^*\|$ by construction, so by substitution of Equation 4 and algebra, it follows that $$\|z(x_t) - x^*\| \leq \left(1 - \frac{\beta\theta}{5d}\right)\|z(b_{t-1}) - x^*\|$$

Thus $$\Delta_t \leq \ln\left(1 - \frac{\beta\theta}{5d}\right)$$

when $\varepsilon_t$ occurs. Since $1+z \leq e^z$ for all $z \in \mathbb{R}$, with $$z = -\frac{\beta\theta}{5d}$$

it is inferred that $$\Delta_t \leq -\frac{\beta\theta}{5d}$$

conditioned on $\varepsilon_t$.
By time T, if $$\gamma_T \leq \frac{5L\delta\sqrt{d}}{2\theta}$$

there is nothing more to prove. Otherwise, for all $t=1, 2, \ldots, T$, $b_t$ must be at distance at least $$\frac{5\delta\sqrt{d}}{2\theta}$$

from any optimal point by the Lipschitz assumption on $f$. This distance is sufficiently large that the algorithm has a chance to select a radius that ensures $\mathcal{R}_t$, since with lower-bound-for-ell it guarantees $\delta \leq \ell/2\sqrt{d}$. Hence $$Pr[\mathcal{R}_t] = 1/\log_2\left(\frac{diam(\mathcal{X})}{\delta\sqrt{d}}\right) \text{ for all } 2 \leq t \leq T.$$

Now consider $\Phi_T = \Phi_1 + \Sigma_{t=2}^T \Delta_T$. Clearly, $\Phi_1 \leq \ln(diam(\mathcal{X}))$. A probabilistic upper bound is desired on $\Delta_{2:T} := \Sigma_{t=2}^T \Delta_t$, ideally of $-c(T-1)$ for some $c>0$.

Let $$\hat{\Delta}_t := \max\left(\Delta_t, -\frac{\beta\theta}{5d}\right).$$

Clearly, $\Sigma_{t=2}^T \Delta_t \leq \Sigma_{t=2}^T \hat{\Delta}_t$, and for all t then $$\hat{\Delta}_t \in \left[-\frac{\beta\theta}{5d}, 0\right], \text{ and } \hat{\Delta}_t = -\frac{\beta\theta}{5d}$$

conditioned on $\varepsilon_t$. Let $\rho_t := Pr[\varepsilon_t | \mathcal{R}_t]$ and recall it is a positive constant. Also, for all t, $$Pr[\varepsilon_t] \geq Pr[\varepsilon_t | \mathcal{R}_t] \, Pr[\mathcal{R}_t] = \rho_t/\log_2\left(\frac{diam(\mathcal{X})}{\delta\sqrt{d}}\right).$$

Azuma's inequality can then be applied on $\hat{\Delta}_{2:T} := \Sigma_{t=2}^T \hat{\Delta}_t$ to prove $$Pr\left[|\hat{\delta}_{2:T} - \mathbb{E}[\hat{\Delta}_{2:T}]| > \alpha\right] \leq 2\exp\left(\frac{-\alpha^2 \cdot 5d}{2(T-1)\beta\theta}\right) \quad (5)$$

To ensure this probability is at most η, it suffices to set $$\alpha = \alpha(\eta) := \sqrt{2(T-1)\frac{\beta\theta}{5d}\ln(2/\eta)}.$$

Moreover, $$\mathbb{E}[\hat{\Delta}_{2:T}] \leq -\sum_{t=2}^T \frac{\beta\theta}{5d}\rho_t/\log_2\left(\frac{diam(\mathcal{X})}{\delta\sqrt{d}}\right) \leq -\frac{\rho(T-1)\beta\theta}{5d \cdot \log_2\left(\frac{diam(\mathcal{X})}{\delta\sqrt{d}}\right)}$$

where $\rho = \min_t \rho_t$ is the minimum probability of significant progress being made in any round when the appropriate ball-sampling radius is chosen. Since $\Delta_t \leq \hat{\Delta}_t$ with certainty, the result is the corresponding bound for $\Delta_{2:T}$. That is, with $\alpha(\eta)$ defined as above, for all η

$$Pr\left[\Phi_T \geq \ln(diam(\chi)) - \frac{(T-1)\rho\beta\theta}{5d \cdot \log_2 \frac{diam(\chi)}{\delta\sqrt{d}}} + \alpha(\eta)\right] \leq \eta \quad (6)$$

As mentioned, the optimality gap satisfies $\gamma(x) \leq L\|x-x^*\| \leq L \exp(\Phi(x))$, so for all $\eta > 0$ $$Pr[\gamma_T \geq L \ diam(\chi) \cdot \exp(-\Lambda)] \leq \eta \quad (7)$$

where $\Lambda$ is as defined in the theorem statement.

Recall this argument only holds if $\gamma_T \leq 5L\delta\sqrt{d}/2\theta$, so a maximum is introduced over the bound in Eq. (7) and $5L\delta\sqrt{d}/2\theta$ to complete the proof.

9.3 A Concrete Example: Ellipsoidal Level Sets

To make Theorem 3 more concrete, a corollary is proven that formalizes the following result: if a function has a sufficiently large region around the global optimum x* in which $f(x) = \psi(\|x-x^*\|)$ for some strictly monotonically increasing function $\psi: \mathbb{R} \to \mathbb{R}$ and some scaled Euclidean norm $\|\cdot\|$, the convergence is still exponentially fast, and only mildly depends on how extreme the distance scaling is, even in arbitrarily high dimension.

Specifically, a lower bound is provided on $\theta$ in Condition 2 for d-dimensional ellipsoids. For an ellipsoid $E := \{x \in \mathbb{R}^d : (x-c)^T M(x-c) \leq 1\}$, $\kappa(E)$ is defined to be the condition number of the matrix M. Hence, it is the square of the ratio of the maximum principle axis length to the minimum.

Theorem 4: An ellipsoid E in arbitrary dimension d has maximum principal curvature everywhere at most $2\kappa(E)/diam(E)$.

Proof. Assume that our ellipse E is not degenerate, else $\kappa(E) = \infty$ and there is nothing to prove. Since curvature is invariant to translations and rotations, it can be assumed without loss of generality that E is centered at the origin, and that our coordinate system has basis vectors along the principle axes of E. Hence, there exists $A = diag(a_1, a_2, \ldots, a_d)$ such that $M = A^T A$, and $a_1 \leq a_2 \leq \ldots \leq a_d$. Define $f(x) := x^T M x = \Sigma_i a_i^2 x_i^2$, and $\mathcal{L}_x := \{x' : f(x') = f(x)\}$.

The curvature is bound at an arbitrary point p as follows:

Let $g(\varepsilon) := -\varepsilon \frac{\nabla f(p)}{\|\nabla f(p)\|}$, let $q(\varepsilon) := p + g(\varepsilon)$, and find the vector $v(\varepsilon) \in \mathbb{R}^d$ to be orthogonal to $\nabla f(p)$ and of minimum length such that $q(\varepsilon) + v(\varepsilon) \in \mathcal{L}_p$. Now consider the largest radius circle $C(\varepsilon)$ in the plane that spans $\{\nabla f(p), v(\varepsilon)\}$ that contains p, $q(\varepsilon) + v(\varepsilon)$, and $q(\varepsilon) - v(\varepsilon)$. Let its radius be $r(\varepsilon)$. The maximum principal curvature at p is then at most $1/\lim_{\varepsilon \to 0} r(\varepsilon)$, because in the limit $C(\varepsilon)$ approaches the osculating circle of the curve created by intersecting E with the normal hyperplane.

To begin, fix $p \in E$ and take the Taylor series approximation of $f$ at p:

$$f(p+\Delta) \approx f(p) + \Delta^T \nabla f(p) + \tfrac{1}{2}\Delta^T H_f(p)\Delta \quad (8)$$

where $H_f p$ is the Hessian of $f$ at p.

Note $\nabla f(p) = [2a_1^2 p_1, 2a_2^2 p_2, \ldots, 2a_d^2 p_d]$ and $H_f(p) = diag(2a_1^2, 2a_2^2, \ldots, 2a_d^2)$. Since $g = g(\varepsilon)$ is proportional to $\nabla f(p)$, then:

$$f(p+g) = f(p) - \varepsilon\|\nabla f(p)\| + \mathcal{O}(\varepsilon^2) \quad (9)$$

Since v is orthogonal to $\nabla f(p)$, $v^T \nabla f(p) = 0$, then:

$$f(p+v) \approx f(p) + \Sigma_i a_i^2 v_i^2 \quad (10)$$

In the limit as $\varepsilon \to 0$, the approximation $$f(p+g+v) \approx f(p) + (f(p+g) - f(p)) + (f(p+v) - f(p)) \quad (11)$$

can be used since any cross terms only contribute $\mathcal{O}(\varepsilon^2)$, while the terms in Eq. 11 are $\Omega(\varepsilon)$, as will be demonstrated.

Recall the aim is to find the minimum length $v(\varepsilon)$ orthogonal to $\nabla f(p)$ such that $\lim_{\varepsilon \to 0}(f(p+g(\varepsilon)+v(\varepsilon))-f(p))/\varepsilon = 0$. A trivial lower bound on this is the minimum length $v(\varepsilon)$ of any vector such that $\lim_{\varepsilon \to 0}(f(p+_9(\varepsilon)+v(\varepsilon))-f(p)/\varepsilon) = 0$. Sum-approx is then combined with taylor-parallel and taylor-orthogonal (ignoring $\mathcal{O}(\varepsilon^2)$ terms) to obtain the following optimization problem:

$$\min\{\|v\| : \Sigma_i a_i^2 v_i^2 = \varepsilon\|\nabla f(p)\|\}. \quad (12)$$

If it is equivalently chosen to minimize $\|v\|^2$ instead, and it is chosen to rewrite the resulting optimization problem using $w_i := a_i^2 v_i^2$, the following problem with the same optimum is obtained:

$$\min\{\Sigma_i w_i/a_i^2 : w \geq 0 \text{ and } \Sigma_i w_i = \varepsilon\|\nabla f(p)\|\} \quad (13)$$

Let $\hat{e}_i$ be the $i^{th}$ unit basis vector. It is straightforward to see the optimum solution is $w^* = \varepsilon\|\nabla f(p)\|\hat{e}_d$, since if $w_i > 0$ for $i \neq d$, $w_i \hat{e}_d - w_i \hat{e}_i$ could be added to w to generate a solution which is at least as good (specifically, at least $w_i(a_d^{-2} - a_i^{-2})$) or better, which is nonnegative since $a_i \leq a_d$ by assumption). The optimization from opt-problem thus has an optimum $v^*$ with $v_d^* = \sqrt{\varepsilon\|\nabla f(p)\|}/a_d$ and $v_i^* = 0$ for all $i \neq d$. Hence $\|v^*\| = \sqrt{\varepsilon\|\nabla f(p)\|}/a_d$.

Next, note that a circle of radius r centered at the origin, the line $x_1 = r - \varepsilon$ passes through $x_2 = \sqrt{r^2 - (r-\varepsilon)^2} = \sqrt{2r\varepsilon - \varepsilon^2}$. Thus, the osculating circle through p is has radius $\lim_{\varepsilon \to 0} r(\varepsilon)$, where $r := r(\varepsilon)$ satisfies $\sqrt{2r\varepsilon - \varepsilon^2} \geq \|v^*\|$. That is, $$\sqrt{2r\varepsilon - \varepsilon^2} \geq \sqrt{\varepsilon\|\nabla f(p)\|}/a_d \quad (14)$$

which reduces to $$r \geq \frac{1}{2}\left(\frac{\|\nabla f(p)\|}{a_d^2} + \varepsilon\right). \quad (15)$$

It is next proven that $\|\nabla f(p)\| \geq 2a_1$ for all $p \in E$. Since $p \in E$, then $p^T \nabla f(p) = 2\Sigma_i a_i^2 p_i^2 = 2$. By the Cauchy-Schwarz inequality, $p^T \nabla f(p) \leq \|p\|\|\nabla f(p)\|$, hence $\|\nabla f(p)\| \geq 2/\|p\|$. It is easy to verify that since E is centered at the origin and its principal axes are aligned, $\min\{\|p\| : p \in E\} = 1/a_1$ satisfied by $p = \hat{e}_1/a_1$. Therefore $\|\nabla f(p)\| \geq 2a_1$, and it is concluded that $$r \geq \frac{1}{2}\left(\frac{\|\nabla f(p)\|}{a_d^2} + \varepsilon\right) \geq \frac{a_1}{a_d^2} \quad (16)$$

The maximum principal curvature at any point $p \in E$ is the reciprocal of the minimum possible radius of an osculating circle in any plane normal to E at p. Hence the maximum principal curvature over all E is at most $$\frac{a_d^2}{a_1}.$$

Since diag(E)=2/$a_1$ and $$\kappa(E) = \frac{a_d^2}{a_1^2},$$

this equals the claimed bound of 2κ(E)/diam(E).

Corollary 5: Fix any $\mathcal{X}$ and objective function $f$ that satisfies Condition 2 for some constants μ, θ with $\mathcal{X}'$ equal to an ellipsoid E. Suppose E:={$x \in \mathbb{R}^d$:$(x-c)^T M(x-c) \leq 1$} for some c and M, and suppose $$\mathcal{L}_x = \{x':(x'-c)^T M(x'-c)=(x-c)^T M(x-c)\}$$

Then Condition 2 holds for θ=1/κ(E).

Lemma 6: Let $B_1$ and $B_2$ be two balls in $\mathbb{R}^d$ of radii $r_1$ and $r_2$ respectively whose centers are unit-distance apart. If $$r_1 \in \left[\frac{1}{2\sqrt{d}}, \frac{1}{\sqrt{d}}\right] \text{ and } r_2 \geq 1 - \frac{1}{4d},$$

then $$vol(B_1 \cap B_2) = \Omega(vol(B_1))$$

Proof. The intersection $B_1 \cap B_2$ is composed of two hyperspherical caps glued end to end. A lower bound is placed on vol($B_1$ n $B_2$) by the volume of the cap $C_1$ of $B_1$. If $B_1$ is centered at the origin, and $B_2$ at $\hat{e}_i$ where $\hat{e}_i$ is the $i^{th}$ unit basis vector, then this cap is {x:x∈$B_1$, $x_1 \geq c_1$}, where $c_1$ is the cap base height. From classic geometry, $$c_1 = \frac{1}{2}(1+r_1^2-r_2^2). \quad (17)$$

For small values of d, it suffices to observe that $r_1 > 1-r_2$ so the balls have an intersection with non-negligible volume.

For larger values of d, it is known that if "slices" are taken through a ball of radius r centered at the origin in d dimensions, the volume of the slices varies approximately as a normal distribution $$N\left(0, \frac{r^2}{d-1}\right).$$

For a textbook treatment, see Ball, Keith. An elementary introduction to modern convex geometry. *Flavors of geometry*, 31:0 1-58, 1997. URL http://library.msri.org/books/Book31/files/ball.pdf. Hence up to constants, vol($C_1$) equals the probability that a random draw from that normal distribution exceeds $c_1$. Thus if $c_1 \leq r_1/\sqrt{d-1}$, this probability is at least ≈0.1586 (from the cumulative distribution function of the standard normal).

Suppose $$r_1 = \frac{\alpha}{2\sqrt{d}} \text{ and } r_2 = 1 - \frac{1}{4d}.$$

It will be shown that $c_1 \leq r_1/\sqrt{d}$ for all $\alpha \in [1,2]$, or equivalently, $r_1/\sqrt{d}-c_1 \geq 0$. From cap-height, $$c_1 = \frac{1}{4d} + \frac{\alpha^2}{8d} - \frac{1}{32d^2}$$

and $r_1/\sqrt{d}=\alpha/2d$. Hence $r_1/\sqrt{d}-c_1 \geq 0$ iff $$\frac{1}{8d}\left(4\alpha - 2 - \alpha^2 + \frac{1}{4d}\right) \geq 0;$$

this holds for all $\alpha \in [1,2]$ since it holds for α=1 and α=2, and $\alpha \to 4\alpha-2-\alpha^2$ is concave so its value at any $\alpha \in [1,2]$ is lower bounded by a convex combination of its values at α=1 and α=2.

For $$r_2 > 1 - \frac{1}{4d},$$

note that increasing the radius of $B_2$ only increases vol($B_1 \cap B_2$), simply because vol($B_1 \cap B'$) vol($B_1 \cap B$) whenever $B' \subset B$.

9.4 A More General Example Convergence Result

In this section the results of section 9.2 are extended to functions with multiple local optima. In this case either uniform random samples or ball-samples may cause some $b_t$ to be in a different basin of attraction than $b_{t-1}$, i.e., the sublevel set of {x: $f(x) \leq f(b_{t-1})$} might not contain a path from $b_{t-1}$ to $b_t$.

The convergence result is generalized by considering the largest connected sublevel set $\mathcal{X}'$ of $f$ that is contained entirely in the feasible region $\mathcal{X}$. So, once a point in $\mathcal{X}'$ is selected, all future iterations will remain within. That is, $x_\tau \in \mathcal{X}'$ implies $b_t \in \mathcal{X}'$ for all t≥τ. From then on, the analysis from the proof of Theorem 3 may be applied, with the caveat that only ball-sampling is performed with probability 1−ε. Recall μ=vol($\mathcal{X}'$)/vol($\mathcal{X}$).

Theorem 7: Let $\mathcal{X} \subset \mathbb{R}^d$ be a closed connected set and let $\mathcal{X}'$ be the largest connected sublevel set $\mathcal{X}'$ of $f$, where $f$ is a smooth L-Lipschitz objective function satisfying Condition 2. Then if $\{x_t\}_{t \geq 1}$ are the points selected by Gradientless Descent, the optimality gap $\gamma_T$ after T steps satisfies, for any $\eta \in (0,1)$ $$Pr\left[\gamma_T \geq L\max\left(\frac{5\delta\sqrt{d}}{2\theta}, diam(\chi) \cdot \exp(-\hat{\Lambda})\right)\right] \leq \eta \quad (18)$$

where $$\hat{\Lambda} := \frac{\rho \hat{S} \beta \theta}{5d \cdot \log_2\left(\frac{diam(\chi)}{\delta\sqrt{d}}\right)} - \sqrt{2\hat{S}\frac{\beta\theta}{5d}(\ln 6/\eta)},$$

where ρ>0 is the absolute constant from Theorem 3, and $$\hat{S} :=$$

$$\hat{S}(T,\varepsilon,\eta) = (1-\varepsilon)(T-\tau-1) - \sqrt{((T-\tau-1)/2)\ln(3/\eta)} \text{ for } \tau = \frac{\ln(2/\eta)}{\varepsilon\mu}$$

is a probabilistic lower bound on the number of ball-sampling rounds after sampling a point in $\mathcal{X}'$ that holds with probability $\eta/3$.

Proof. For any $\tau$, observe that $\Pr[b_\tau \notin \mathcal{X}'] \leq (1-\varepsilon\mu)^\tau$. Hence to ensure this probability is below $\eta/3$, it is sufficient to set $$\tau = \log(3/\eta)/\log\left(\frac{1}{1-\varepsilon\mu}\right).$$

Note that $$\ln\left(\frac{1}{1-x}\right) \geq x$$

for all $x \in [0,1)$, so $$\ln\left(\frac{1}{1-\varepsilon\mu}\right) \geq \varepsilon\mu,$$

so to ensure the is probability is at most $\eta$, it is sufficient to set $$\tau = \frac{\ln(2/\eta)}{\varepsilon\mu}.$$

Next, the number of ball-samples S taken in steps $t \in (\tau, T]$ are considered (as opposed to uniform random samples, i.e., S is $|\{t:t \in T\}, x_t \sim \mathcal{U}(B_t)$ for some ball $B_t\}|$). Note S is distributed as a binomial distribution $B(T-\tau-1,1-\varepsilon)$, so by Chernoff's inequality $\Pr[S < \mathbb{E}[S]-\alpha] \leq \exp(-2\alpha^2/(T-\tau-1))$, for all $\alpha \geq 0$. To ensure this probability is at most $\eta/3$ it is sufficient to set $\alpha=\sqrt{((T-\tau-1)/2)\ln(3/\eta)}$.

Substituting for $\hat{S}(T,\varepsilon,\eta)$ and $\tau$, it is found that $S < \hat{S}(T,\varepsilon,\eta) \leq \eta/3$. Hence by the union bound, the probability that $b_\tau \notin \mathcal{X}'$ and there are $\hat{S}(T,\varepsilon,\eta)$ ball-samples subsequent to $\tau$ is at least $1-2\eta/3$. Theorem 3 can then be applied with a residual probability of failure of $\eta/3$ to obtain the claimed result.

9.5 Example Comparison to Random Search and Gradient Descent

Gradientless Descent combines many of the desirable properties of random search and gradient descent. Like random search, it is robust to pathological objectives. It is non-oblivious, but only slightly, insofar as it only considers the rank ordering of points. Hence its behavior is invariant under monotone transformations of the objective value, and it is immune to noise that does not change the rank order of the evaluated points $x_{t>0}$. Insofar as it does not model the objective in any way, it is also very robust even to many kinds of noise that do re-rank the points.

Remarkably, despite these similarities to random search, Gradientless Descent has convergence properties not unlike gradient descent, without using any gradients. Gradient descent is known to converge exponentially fast to the optimal solution for suitably strongly-convex objective functions $f$:

Theorem 8: Let $f: \mathcal{X} \to \mathbb{R}$ be a strongly convex, L-lipschitz continuous function on $\mathcal{X} \subseteq \mathbb{R}^d$, such that there exist constants $0 < m < M$ with $mI \preceq \nabla^2 f(x) \preceq MI$ for all $x \in \mathcal{X}$ (where I is the identity matrix), and such that the unique minimizer $x^*$ of $f$ lies in $\mathcal{X}$. Then gradient descent with fixed step size $1/M$ starting at $x_0$ satisfies $f(x_t) - f(x^*) \leq c^t (f(x_0) - f(x^*))$ where $$c = \left(1 - \frac{m}{M}\right).$$

See section 9.3 of Boyd and Vandenberghe. Convex Optimization. Cambridge University Press, Cambridge.

Note the number of iterations to reach a desired accuracy depends linearly on $M/m$, which Boyd and Vandenberghe point out is a bound on the condition number on the sublevel sets $\{x: f(x) \leq y\}$.

These results are now compared to the convergence results for Gradientless Descent. To make the comparison fair, gradient descent is charged $d+1$ for an evaluation of $f$ that provides $f(x)$ and the gradient $\nabla f(x)$, where there are d dimensions. Inspecting Theorem 3, it can be seen that before hitting the minimum resolution $\delta$, the optimality gap shrinks roughly as $c^t$ for $$c = 1 - \Theta\left(\frac{\theta\beta}{d \cdot \log_2\left(\frac{diam(\mathcal{X})}{\delta\sqrt{d}}\right)}\right).$$

It has been proven that the convergence exponent for Gradientless Descent depends linearly on condition number of sublevel sets when the level sets are ellipsoids, in a direct analogy to gradient descent. More generally, the $\theta\beta$ terms represent this dependence in the statement of Theorem 3. Hence after d steps, Gradientless Descent will shrink the optimality gap by a factor of roughly $$c^d = 1 - \Theta\left(\theta\beta/\log_2\left(\frac{diam(\mathcal{X})}{\delta\sqrt{d}}\right)\right),$$

while gradient descent will shrink it by $$1 - \frac{m}{M}$$

with a single evaluation that includes gradients, which is analogous to $1-\Theta(\theta\beta)$.

So, if the gradient computation costs d, Gradientless Descent converges analogously to gradient descent, aside from the $$\log_2\left(\frac{diam(\mathcal{X})}{\delta\sqrt{d}}\right)$$

term in the denominator. This term exists because the appropriate radius needs to be guessed (roughly $\theta \|b_{t-1}-x^*\|/\sqrt{d}$). Bear in mind that in many cases, gradient descent is also similarly slowed, because the appropriate step size for gradient descent based on M which is not typically known apriori. If the step size had to be guessed, or a line search gradient descent had to be performed, a similar penalty could be incurred.

The similarities in the rates of convergence are striking in light of the simplicity of Gradientless Descent and the differences in assumptions about $f$. In particular, Gradientless Descent does not require convexity at all, but only balanced level-sets without corners. For example, it will perform equally well on $f(x)=\|x\|_2-\sin(\|x\|_2)$ as on $f(x)=\|x\|_2^2$, exhibiting exponentially fast convergence on both, with only an inverse linear dependence on dimensionality.

Like gradient descent, Gradientless Descent may be viewed as a basic algorithmic chassis upon which more sophisticated variants can be built. For example, just as one may decay or adaptively vary learning rates for gradient descent, one might change the distribution from which the ball-sampling radii are chosen, perhaps shrinking the minimum radius $\delta$ as the algorithm progresses, or concentrating more probability mass on smaller radii. As another example, analogously to adaptive per-coordinate learning rates (see, e.g., Duchi et al. Adaptive subgradient methods for online learning and stochastic optimization. *Journal of Machine Learning Research*, 120 (July):0 2121-2159, 2011; and McMahan and Streeter. Adaptive bound optimization for online convex optimization. In *COLT 2010 —The 23rd Conference on Learning Theory*, Haifa, Israel, Jun. 27-29, 2010, pp. 244-256, 2010), the shape of the balls being sampled could be adaptively changed into ellipsoids with various length-scale factors. Thus, as used herein, the term "ball" does not exclusively refer to circular or spherical shaped spaces but can also include ellipsoids or other curved, enclosed shapes.

10. Example Devices and Systems

Figure 12:
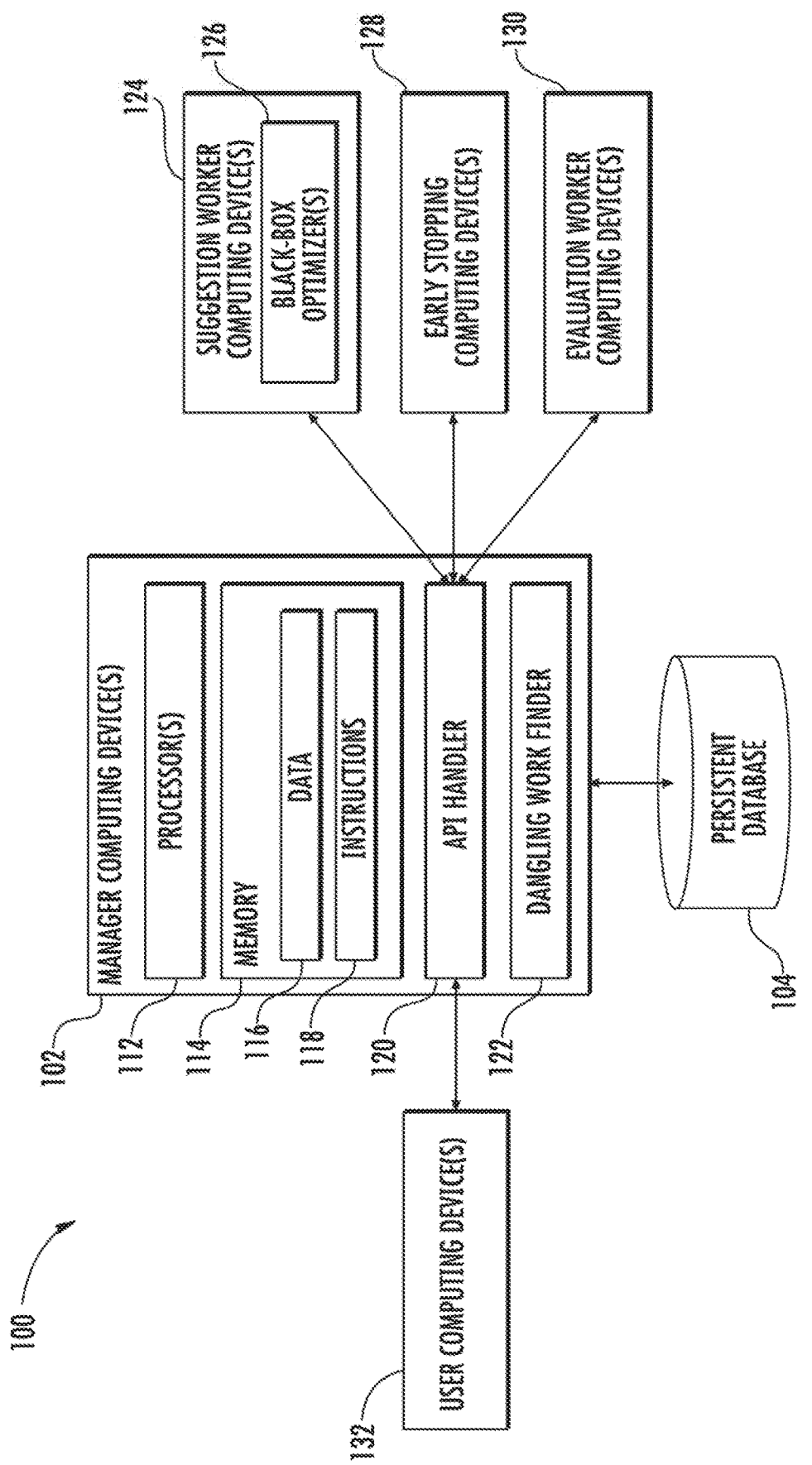
FIG. 12 depicts a block diagram of an example computing system according to example embodiments of the present disclosure.

FIG. 12 depicts a block diagram of an example computing system 100 according to example embodiments of the present disclosure. The example computing system 100 can include one or more user computing devices 132; one or more manager computing devices 102; one or more suggestion worker computing devices 124; one or more early stopping computing devices 128; one or more evaluation worker computing devices 130; and a persistent database 104.

The database 104 can store a full state of one or more Trials and/or Studies along with any other information associated with a Trial or a Study. The database can be one database or can be multiple databases operatively connected.

The manager computing device(s) 102 can include one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor(s) 112 to cause the computing system 102 to perform operations.

Similar to the manager computing device(s) 102, each of: the one or more user computing devices 132; the one or more suggestion worker computing devices 124; the one or more early stopping computing devices 128; and the one or more evaluation worker computing devices 130 can include one or more processors (e.g., a processor core, a microprocessor, an ASIC, a FPGA, a controller, a microcontroller, etc.) and a memory (e.g., RAM, ROM, EEPROM, EPROM, flash memory devices, magnetic disks, etc.) as described above with respect to reference numerals 112 and 114. Thus, each device can include processor(s) and a memory as described above.

The manager computing device(s) 102 can include an API handler 120 and a dangling work finder 122. The API handler 120 can implement and/or handle requests that come from the user computing device(s) 132 via an API. The API can be a REST API and/or can use an internal RPC protocol. The API handler 120 can receive requests from the user computing device(s) 132 that use the API (e.g., a request to check the status of an operation) and can communicate with the one or more suggestion worker computing devices 124; one or more early stopping computing devices 128; one or more evaluation worker computing devices 130; and/or a persistent database 104 to provide operations and/or information in response to the user request via the API.

The dangling work finder 122 can restart work lost to preemptions. For example, when a request is received by a suggestion worker computing device 124 to generate suggestions, the suggestion worker computing device 124 can first place a distributed lock on the corresponding Study, which can ensure that work on the Study is not duplicated by multiple devices or instances. If the suggestion worker computing device 124 instance fails (e.g., due to e.g. hardware failure, job preemption, etc.), the lock can expire, making it eligible to be picked up by the dangling work finder 122 which can then reassign the Study to a different suggestion worker computing device 124.

In some implementations, if a Study is picked up by the dangling work finder 122 too many times, the dangling work finder 122 can detect this, temporarily halt the Study, and alert an operator to the crashes. This can help prevent subtle bugs that only affect a few Studies from causing crash loops that can affect the overall stability of the system.

Each of the API handler 120 and the dangling work finder 122 can include computer logic utilized to provide desired functionality. Each of the API handler 120 and the dangling work finder 122 can be implemented in hardware, firmware, and/or software controlling a general purpose processor. For example, in some implementations, each of the API handler 120 and the dangling work finder 122 includes program files stored on a storage device, loaded into a memory and executed by one or more processors. In other implementations, each of the API handler 120 and the dangling work finder 122 includes one or more sets of computer-executable instructions that are stored in a tangible computer-readable storage medium such as RAM hard disk or optical or magnetic media.

In some implementations, the user computing device(s) can include personal computing devices, laptops, desktops, user server devices, smartphones, tablets, etc. In some implementations, the user computing device(s) 132 can interact with the API handler 120 via an interactive user interface. In some implementations, the user computing device(s) 132 can perform suggestion evaluation in addition to or alternatively to the evaluation worker computing device(s) 130. In some implementations, a user can evaluate a suggested set of parameters offline and then enter the result of the evaluation into the user computing device 132 which is then communicated to the manager computing device 102 and stored in the persistent database 104.

The suggestion worker computing device(s) 126 can provide one or more suggested set of parameters. For example, the suggestion worker computing device(s) 126 can implement one or more black-box optimizers 126 to generate the new suggestions. The one or more black-box optimizers 126 can implement any of the example black-box optimization techniques described above.

The early stopping computing device(s) 128 can perform one or more early stopping techniques to determine whether to stop an evaluation of a Trial that is in progress. For example, example early stopping techniques are described above in sections 3.1 and 3.2.

The evaluation worker computing device(s) 130 can evaluate a suggested set of parameters and, in response, provide a result. For example, the result can be an evaluation of an objective function for a suggested set of parameters. In some implementations, the evaluation worker computing device(s) 130 can be provided and/or owned by the user. In other implementations, the evaluation worker computing device(s) 130 are provided as a managed service. In some implementations in which suggested Trials can be evaluated offline (e.g., through manual or physical evaluation), the evaluation worker computing device(s) 130 are not used or included.

11. Example Methods

Figure 13:
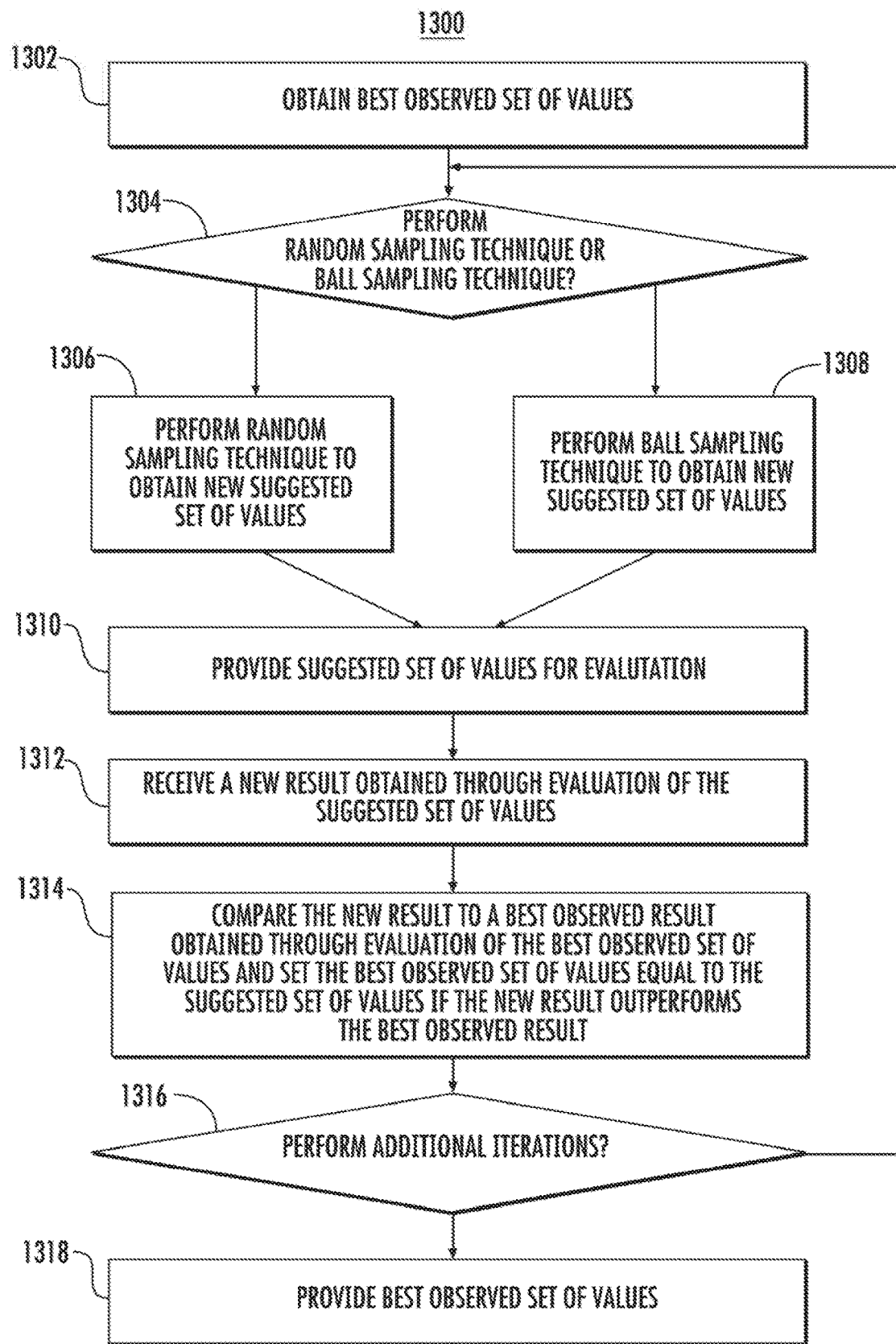
FIG. 13 depicts a flow chart diagram of an example method to perform black-box optimization according to example embodiments of the present disclosure.

FIG. 13 depicts a flow chart diagram of an example method 1300 to perform black-box optimization according to example embodiments of the present disclosure.

At 1302, a computing system obtains a best observed set of values. For example, the best observed set of values can be retrieved from a memory. The best observed set of values can include a value for each of one or more adjustable parameters.

In some implementations, at a first instance of 1302, the best observed set of values can simply be set equal to a first suggested set of values. For example, the first suggested set of values can simply be a random selection from a feasible parameter space for the one or more adjustable parameters.

At 1304, the computing system determines whether to perform a random sampling technique or a ball sampling technique. In some implementations, the determination made at 1304 can be probabilistic. For example, in some implementations, determining whether to perform the random sampling technique or the ball sampling technique at 1304 can include determining whether to perform the random sampling technique or the ball sampling technique according to a predefined probability. For example, the predefined probability can be a user-defined probability.

When the probability is greater than zero, method 1300 can, in at least some iterations, investigate uniformly randomly sampled points. This can be used to handle multiple minima, and can guarantee that the worst-case performance cannot be much worse than Random Search.

In some implementations, the predefined probability can change (e.g., adaptively change) over a number of iterations of the method 1300. For example, the predefined probability can increasingly lead to selection of the ball sampling technique at 1304 as the number of iterations increases.

If it is determined at 1304 that the random sampling technique should be performed, then method 1300 can proceed to 1306. At 1306, the computing system performs the random sampling technique to obtain a new suggested set of values. For example, the random sampling technique can include selecting a random sample from the feasible parameter space for the one or more adjustable parameters.

However, referring again to 1304, if it is determined at 1304 that the ball sampling technique should be performed, then method 1300 can proceed to 1308. At 1308, the computing system performs the ball sampling technique to obtain a new suggested set of values.

Figure 14:
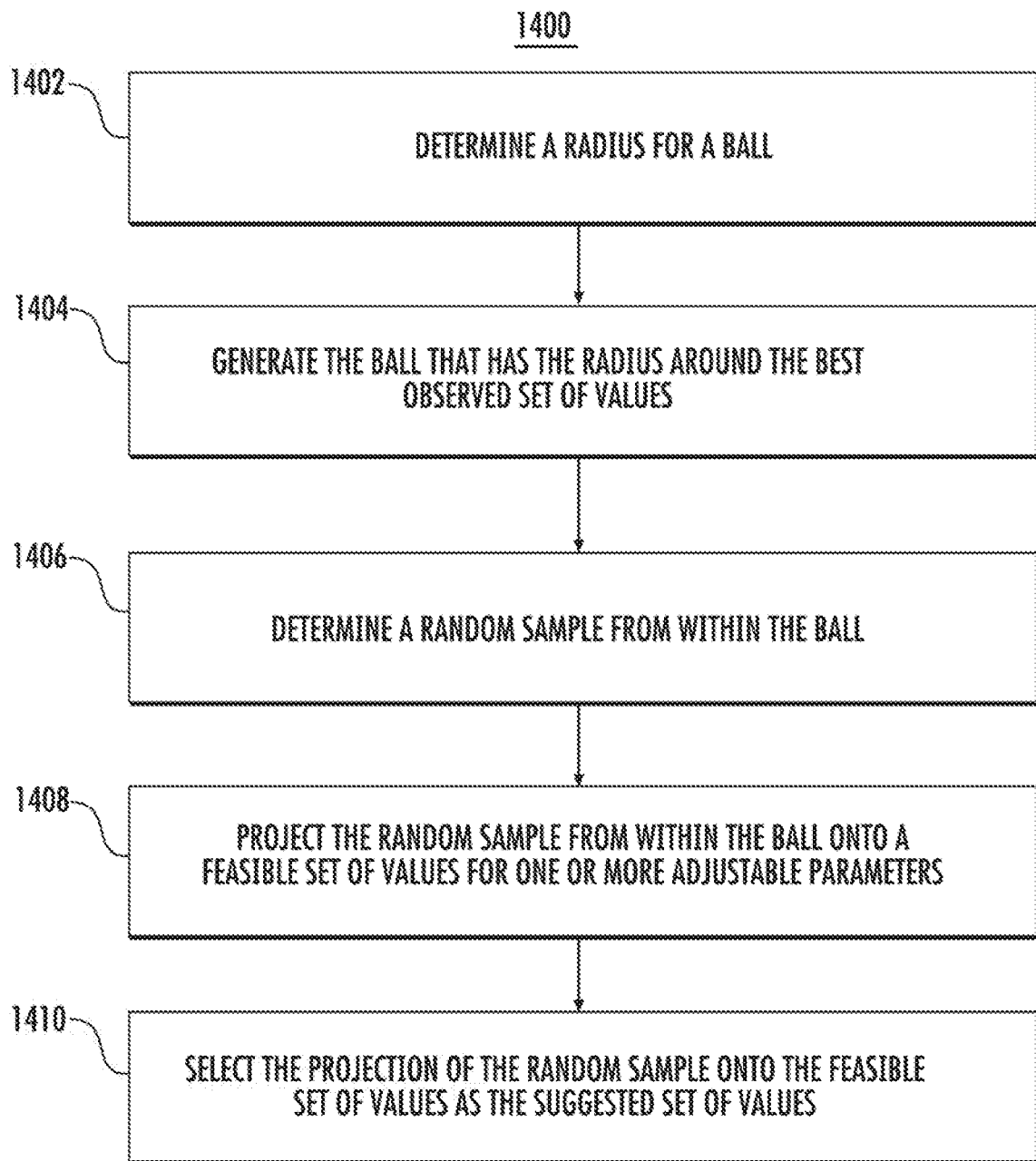
FIG. 14 depicts a flow chart diagram of an example method to perform a ball sampling technique according to example embodiments of the present disclosure.

As one example ball sampling technique that can be performed, FIG. 14 depicts a flow chart diagram of an example method 1400 to perform a ball sampling technique according to example embodiments of the present disclosure.

At 1402, a computing system determines a radius for a ball. In some implementations, at 1402, the radius can be selected from a geometric series of possible radii. For example, the radius can be selected at random from the geometric series of radii. In some implementations, an upper limit on the geometric series of radii can be dependent on the diameter of the dataset, a resolution of the dataset, and/or a dimensionality of an objective function.

In some implementations, determining the radius for the ball at 1402 can include determining the radius based at least in part on a user-defined resolution term. As one example, determining the radius for the ball at 1402 can include randomly sampling the radius from a distribution of available radii that has a minimum equal to the user-defined resolution term. In some implementations, determining the radius for the ball at 1402 can include randomly sampling the radius from a distribution of available radii that has a maximum that is based at least in part on a diameter of the feasible set of values for the one or more adjustable parameters.

At 1404, the computing system generates the ball that has the radius around the best observed set of values. At 1406, the computing system determines a random sample from within the ball.

At 1408, the computing system projects the random sample from within the ball onto the feasible set of values for one or more adjustable parameters. At 1410, the computing system selects the projection of the random sample onto the feasible set of values as the suggested set of values.

Referring again to FIG. 13, having obtained a new suggested set of values at 1306 or 1308, next at 1310, the computing system provides the suggested set of values for evaluation.

At 1312, the computing system receives a new result obtained through evaluation of the suggested set of values. At 1314, the computing system compares the new result to a best observed result obtained through evaluation of the best observed set of values and sets the best observed set of values equal to the suggested set of values if the new result outperforms the best observed result.

At 1316, the computing system determines whether to perform additional iterations. The determination at 1316 can be made according to a number of different factors. In one example, iterations are performed until an iteration counter reaches a predetermined threshold. In another example, iteration-over-iteration improvement (e.g., |previous best result—new result|) can be compared to a threshold value. The iterations can be stopped when the iteration-over-iteration improvement is below the threshold value. In yet another example, the iterations can be stopped when a certain number of sequential iteration-over-iteration improvements are each below the threshold value. Other stopping techniques can be used as well.

If it is determined at 1316 that additional iterations should be performed, then method 1300 returns to 1304. In such fashion, new suggested sets of values can be iteratively produced and evaluated.

However, if it is determined at 1316 that additional iterations should not be performed, then method 1300 proceeds to 1318. At 1318, the computing system provides the best observed set of values as a result.

12. Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 13 and 14 respectively depict steps performed in a particular order for purposes of illustration and discussion, the methods of the present disclosure are not limited to the particularly illustrated order or arrangement. The various steps of the methods 1300 and 1400 can be omitted, rearranged, combined, and/or adapted in various ways without deviating from the scope of the present disclosure.

What is claimed is:

1. A computer-implemented method for use in optimization of parameter values for machine-learning models, the method comprising:
   receiving, by one or more computing devices, one or more prior evaluations of performance of a machine learning model, the one or more prior evaluations being respectively associated with one or more prior variants of the machine-learning model, the one or more prior variants of the machine-learning model each having been configured using a different set of adjustable parameter values;
   utilizing, by the one or more computing devices, an optimization algorithm to generate a suggested variant of the machine-learning model based at least in part on the one or more prior evaluations of performance and the associated set of adjustable parameter values, the suggested variant of the machine-learning model being defined by a suggested set of adjustable parameter values;
   receiving, by the one or more computing devices, one or more intermediate evaluations of performance of the suggested variant of the machine-learning model, the intermediate evaluations having been obtained from an ongoing evaluation of the suggested variant of the machine-learning model;
   performing, by the one or more computing devices, non-parametric regression, based on the intermediate evaluations and the prior evaluations, to determine whether to perform early-stopping of the ongoing evaluation of the suggested variant of the machine-learning model, wherein early-stopping is to be performed when the ongoing evaluation is determined to fall below a performance threshold; and
   in response to determining that early-stopping is to be performed, causing, by the one or more computing devices, early-stopping to be performed in respect of the ongoing evaluation of the suggested variant of the machine-learning model.

2. The method of claim 1, wherein performing, by the one or more computing devices, non-parametric regression to determine whether to perform early-stopping of the ongoing evaluation of the suggested variant of the machine-learning model comprises:
   determining, by the one or more computing devices based on the non-parametric regression, a probability of a final performance of the suggested variant of the machine-learning model exceeding a current best performance as indicated by one of the prior evaluations of performance of a prior variant of the machine-learning model;
   determining, by the one or more computing devices, whether to perform early-stopping of the ongoing evaluation based on a comparison of the determined probability with a threshold.

3. The method of claim 1, wherein performing, by the one or more computing devices, non-parametric regression to determine whether to perform early-stopping of the ongoing evaluation of the suggested variant of the machine-learning model comprises:
   measuring, by the one or more computing devices, a similarity between a performance curve that is based on the intermediate evaluations and a performance curve corresponding to performance of a current best variant of the machine-learning model that is based on the prior evaluation for the current best variant of the machine-learning model.

4. The method of claim 1, further comprising performing, by the one or more computing devices, transfer learning to obtain initial values for one or more adjustable parameters of the machine-learning model, wherein performing, by the one or more computing devices, transfer learning comprises:
   identifying, by the one or more computing devices, a plurality of previously-optimized machine-learned models, the plurality of previously-optimized machine-learned models being organized in a sequence; and
   building, by the one or more computing devices, a plurality of Gaussian Process regressors respectively for the plurality of previously-optimized machine-learned models, wherein the Gaussian Process regressor for each previously-optimized machine-learned model is trained on one or more residuals relative to the Gaussian Process regressor for the previous previously-optimized machine-learned model in the sequence.

5. A computer system operable to suggest parameter values for machine-learned models, the computer system comprising:
   a database that stores one or more results respectively associated with one or more sets of parameter values for one or more adjustable parameters of a machine-learned model, the result for each set of parameter values comprising an evaluation of the machine-learned model constructed with such set of parameter values for the one or more adjustable parameters;

one or more processors; and one or more non-transitory computer-readable media that store instructions that, when executed by the one or more processors, cause the computer system to perform operations, the operations comprising:

performing one or more black box optimization techniques to generate a suggested set of parameter values for the one or more adjustable parameters of the machine-learned model based at least in part on the one or more results and the one or more sets of parameter values respectively associated with the one or more results;

accepting an adjustment to the suggested set of parameter values from a user, the adjustment comprising at least one change to the suggested set of parameter values to form an adjusted set of parameter values;

receiving a new result obtained through evaluation of the machine-learned model constructed with the adjusted set of parameter values;

associating the new result and the adjusted set of parameter values with the one or more results and the one or more sets of parameter values in the database;

receiving intermediate statistics associated with an ongoing evaluation of an additional set of parameter values;

performing non-parametric regression on the intermediate statistics to determine whether to perform early stopping of the ongoing evaluation, wherein early stopping is to be performed when the ongoing evaluation is determined to fall below a performance threshold; and in response to determining that early stopping is to be performed, causing early stopping to be performed in respect of the ongoing evaluation.

6. The computer system of claim 5, wherein the operations further comprise:

generating a second suggested set of parameter values for the one or more adjustable parameters of the machine-learned model based at least in part on the new result for the adjusted set of parameter values.

7. The computer system of claim 5, wherein the one or more adjustable parameters of the machine-learned model comprises one or more adjustable hyperparameters of the machine-learned model.

8. The computer system of claim 5, wherein the operations further comprise performing a plurality of rounds of generation of suggested sets of parameter values using at least two different black box optimization techniques.

9. The computer system of claim 8, wherein the operations further comprise automatically changing black box optimization techniques between at least two of the plurality of rounds of generation of suggested sets of parameter values.

10. The computer system of claim 8, wherein the at least two different black box optimization techniques are stateless so as to enable switching between black box optimization techniques between at least two of the plurality of rounds of generation of suggested sets of parameter values.

11. The computer system of claim 5, wherein the operations further comprise:

performing a plurality of rounds of generation of suggested sets of parameter values;

receiving a change to a feasible set of values for at least one of the one or more adjustable parameters of the machine-learned model between at least two of the plurality of rounds of generation of suggested sets of parameter values.

12. The computer system of claim 5, wherein the operations further comprise:

receiving intermediate statistics associated with an ongoing evaluation of an additional set of parameter values; and performing non-parametric regression on the intermediate statistics to determine whether to perform early stopping of the ongoing evaluation.

13. The computer system of claim 5, wherein the operations further comprise performing transfer learning to obtain initial parameter values for the one or more adjustable parameters, wherein performing transfer learning comprises:

identifying a plurality of previously studied machine-learned models, the plurality of previously studied machine-learned models organized in a sequence; and building a plurality of Gaussian Process regressors respectively for the plurality of previously studied machine-learned models, wherein the Gaussian Process regressor for each previously studied machine-learned model is trained on one or more residuals relative to the Gaussian Process regressor for the previous previously studied machine-learned model in the sequence.

14. The computer system of claim 5, wherein the operations further comprise providing for display a parallel coordinates visualization of the one or more results and the one or more sets of parameter values for the one or more adjustable parameters.

15. A computer-implemented method to suggest parameter values for machine-learned models, the method comprising:

receiving, by the one or more computing devices, one or more results respectively associated with one or more sets of parameter values for one or more adjustable parameters of a machine-learned model, the result for each set of parameter values comprising an evaluation of the machine-learned model constructed with such set of parameter values for the one or more adjustable parameters;

generating, by the one or more computing devices, a suggested set of parameter values for the one or more adjustable parameters of the machine-learned model based at least in part on the one or more results and the one or more sets of parameter values respectively associated with the one or more results;

receiving, by the one or more computing devices, an adjustment to the suggested set of parameter values from a user, the adjustment comprising at least one change to the suggested set of parameter values to form an adjusted set of parameter values;

receiving, by the one or more computing devices, a new result associated with the adjusted set of parameter values;

associating, by the one or more computing devices, the new result and the adjusted set of parameter values with the one or more results and the one or more sets of parameter values in a database that stores the one or more results respectively associated with the one or more sets of parameter values for one or more adjustable parameters of a machine-learned model;

receiving, by the one or more computing devices, intermediate statistics associated with an ongoing evaluation of an additional set of parameter values;

performing, by the one or more computing devices, non-parametric regression on the intermediate statistics to determine whether to perform early stopping of the ongoing evaluation, wherein early stopping is to be performed when the ongoing evaluation is determined to fall below a performance threshold;

in response to determining that early stopping is to be performed, causing, by the one or more computing devices, early stopping to be performed in respect of the ongoing evaluation.

16. The computer-implemented method of claim 15, wherein the one or more adjustable parameters of the machine-learned model comprises one or more adjustable hyperparameters of the machine-learned model.

17. The computer-implemented method of claim 15, further comprising:

generating, by the one or more computing devices, a second suggested set of parameter values for the one or more adjustable parameters of the machine-learned model based at least in part on the new result for the adjusted set of parameter values.

18. The computer-implemented method of claim 17, wherein:

generating, by the one or more computing devices, the suggested set of parameter values comprises performing, by the one or more computing devices, a first black box optimization technique to generate the suggested set of parameter values based at least in part on the one or more results and the one or more sets of parameter values; and generating, by the one or more computing devices, the second suggested set of parameter values comprises performing, by the one or more computing devices, a second black box optimization technique to generate the second suggested set of parameter values based at least in part on the new result for the adjusted set of values;

wherein the second black box optimization technique is different from the first black box optimization technique.

19. The computer-implemented method of claim 18, further comprising:

prior to performing, by the one or more computing devices, the second black box optimization technique to generate the second suggested set of parameter values, receiving, by the one or more computing devices, a user input that selects the second black box optimization technique from a plurality of available black box optimization techniques.

20. The computer-implemented method of claim 18, further comprising:

prior to performing, by the one or more computing devices, the second black box optimization technique to generate the second suggested set of parameter values, automatically selecting, by the one or more computing devices, the second black box optimization technique from a plurality of available black box optimization techniques.

* * * * *